(12) United States Patent
Zokaei et al.

(10) Patent No.: US 10,754,360 B2
(45) Date of Patent: Aug. 25, 2020

(54) WIRELESS LEAK ALARM, AND WIRELESS VALVE, APPARATUS, SYSTEM AND A METHOD THEREOF

(71) Applicant: Vidtek Associates NV, Inc., Sparks, NV (US)

(72) Inventors: Reza Zokaei, Sparks, NV (US); Mohammad Jalilian, Sparks, NV (US)

(73) Assignee: Vidtek Associates Inc., Santa Clara, CA (US)

( * ) Notice: Subject to any disclaimer, the term of this patent is extended or adjusted under 35 U.S.C. 154(b) by 0 days.

(21) Appl. No.: 16/252,571

(22) Filed: Jan. 19, 2019

(65) Prior Publication Data

US 2019/0258278 A1 Aug. 22, 2019

Related U.S. Application Data

(63) Continuation-in-part of application No. 15/170,854, filed on Jun. 1, 2016, now Pat. No. 10,186,137.

(60) Provisional application No. 62/169,170, filed on Jun. 1, 2015.

(51) Int. Cl.
| | |
|---|---|
| *G05D 7/06* | (2006.01) |
| *G01M 3/04* | (2006.01) |
| *G08B 25/10* | (2006.01) |
| *G01M 3/18* | (2006.01) |
| *H04W 84/18* | (2009.01) |

(52) U.S. Cl.
CPC ............ *G05D 7/0635* (2013.01); *G01M 3/04* (2013.01); *G01M 3/184* (2013.01); *G08B 25/10* (2013.01); *H04W 84/18* (2013.01)

(58) Field of Classification Search
None
See application file for complete search history.

(56) References Cited

U.S. PATENT DOCUMENTS

| | | | | |
|---|---|---|---|---|
| 5,251,653 | A | * 10/1993 | Tucker | .................... F16K 17/20 137/460 |
| 2001/0054965 | A1 | 12/2001 | Blum | |
| 2006/0007008 | A1 | 1/2006 | Kates | |
| 2010/0302047 | A1 | 12/2010 | Wood | |
| 2011/0066297 | A1 * | 3/2011 | Saberi | ................. F16K 37/0091 700/287 |

(Continued)

*Primary Examiner* — Thomas S McCormack
(74) *Attorney, Agent, or Firm* — Palo Alto Legal Group, P.C.; Omair M. Farooqui; Aziz M. Ahsan

(57) ABSTRACT

The present invention relates generally to a wireless leak alarm, and wireless valve, apparatus, system, and a method thereof. The present invention may be implemented with leak detectors for any type of fluid, liquid, or gas. The present invention may be implemented with any type of sensory detector, such as, for example, a temperature, a moisture, a Carbon Monoxide, a Carbon Dioxide detector. The present invention allows the use of a Wireless, Bluetooth, Wi-Fi leak detector and monitor. More specifically, aspects of the present invention relate to a system, methods, and apparatus for a Wireless, Bluetooth, Wi-Fi leak detector, monitor and valve controller. The present invention includes the ability to communicate via voice message, text message, email and other wireless communication methods to the property owner, manager, resident, person responsible for a dwelling, call center, or any other designated contact in the event of a fluid or water leak.

20 Claims, 16 Drawing Sheets

(56) References Cited

U.S. PATENT DOCUMENTS

| | | | |
|---|---|---|---|
| 2011/0308638 A1* | 12/2011 | Hyland | E03B 9/06 137/299 |
| 2012/0144898 A1 | 6/2012 | Brasel | |
| 2013/0049968 A1 | 2/2013 | Fleury, Jr. | |
| 2013/0080081 A1 | 3/2013 | Dugger | |
| 2013/0255798 A1 | 10/2013 | McAward | |
| 2016/0177546 A1 | 6/2016 | Cregg | |
| 2016/0219516 A1* | 7/2016 | Subramanian | H04W 52/0219 |

* cited by examiner

WIRELESS LEAK ALARM, AND WIRELESS VALVE, APPARATUS, SYSTEM AND A METHOD THEREOF

CROSS-REFERENCE TO RELATED APPLICATIONS

The instant CIP (Continuation-In-Part) patent application claims priority to and the benefit of pending U.S. patent application Ser. No. 15/170,854, filed on Jun. 1, 2016, titled "SYSTEM, METHODS, AND APPARATUS FOR A LEAK DETECTOR AND MONITOR", and which issued on Jan. 22, 2019, as U.S. Pat. No. 10,186,137, and which claimed priority to U.S. Provisional Patent Application Ser. No. 62/169,170, filed on Jun. 1, 2015, titled "SYSTEM METHODS AND APPARATUS FOR A LEAK DETECTOR AND MONITOR," the entire disclosure of each application is incorporated herein by reference.

FIELD OF THE INVENTION

The present invention relates generally to a wireless leak alarm, and wireless valve, apparatus, system, and a method thereof. Aspects of the present invention may be implemented with leak detectors for any type of solid, liquid, or gas. Aspects of the present invention may be implemented with any type of sensory detector, such as, for example, a temperature, moisture, CO (Carbon Monoxide), a CO2 (Carbon Dioxide) detector. Aspects of the present invention relate to a system, methods, and apparatus for a Wi-Fi leak detector and monitor. More specifically, aspects of the present invention relate to a system, methods, and apparatus for a Wi-Fi leak detector, monitor and valve controller. Aspects of the present invention include the ability to communicate via voice message, text message, email and other wireless communication methods to the property owner, manager, resident, person responsible for a dwelling, call center or other designated contacts in the event of a fluid leak.

BACKGROUND INFORMATION

Fluid leak detectors, and leak monitoring apparatus, and systems have been used in the industry for a variety of reasons, and under a variety of conditions. For example, a property owner, manager, resident, or person responsible for a dwelling is usually always responsible for the dwelling or property, and thus if there is a fluid leak in the dwelling, facility, or equipment, then there has to be a way of communicating that fluid leak problem to at least one person. This problem can be compounded, especially, when the person who is responsible is away for a period of time, such as, for example, away at work, on vacation, or otherwise absent from the property. As a further example, there is a chance of a leak in a multiple level dwelling without the resident being aware of the fluid leak, for example, in the basement of a building, or at a remote location, or at a location which may not normally be regularly monitored. However, if there was a way to monitor dwellings, other buildings and equipment for operating or environmental failure so that reparative action can be taken in a timely manner, costly and time consuming damages could be prevented. Accordingly, there is an urgent need for a system, method and apparatus for a leak detector and monitor, especially one that is wireless.

This invention improves on the deficiencies of the prior art and provides an inventive wireless leak alarm, and wireless valve, apparatus, system, and a method thereof.

PURPOSES AND SUMMARY OF THE INVENTION

The invention is a novel wireless leak alarm, and wireless valve, apparatus, system, and a method thereof.

Therefore, one purpose of this invention is to provide a wireless leak alarm, and wireless valve, apparatus, system, and a method thereof.

Aspects of the present invention include a leak detector and monitor comprising: at least one leak sensor adapted to detect a leak of a substance; at least one microcontroller adapted to receive and interact with a signal from the leak sensor, as the microcontroller is acting as a processor and a communication server; and at least one wireless communication module adapted to receive the signal from the microcontroller, whereby the wireless communication module transmits an electronic message to at least one user, whereby the user wirelessly communicates his instructions to the microcontroller to exercise control over at least one electrical valve by transmitting at least one electrical signal to the electrical valve.

Aspects of the present invention include a leak detector and monitor comprising: at least one leak sensor adapted to detect a leak of a substance; at least one microcontroller adapted to receive a signal from the leak sensor; and at least one wireless communication module adapted to receive the signal from the microcontroller, whereby the wireless communication module transmits an electronic message to an Internet cloud based server and the Internet cloud based server transmits the electronic message to a user's device, whereby the user wirelessly communicates his instructions to the Internet cloud based server and the Internet cloud based server transmits the user's instructions to the microcontroller to exercise control over at least one electrical valve by transmitting at least one electrical signal to the electrical valve.

Aspects of the present invention include a method of remotely exercising control over an electrical valve comprising the steps of: positioning a leak detector in a location to amenable to detecting leaks; receiving a notification of a leak; and communicating instructions to exercise control over an electrical valve, whereby causing the electrical valve to be shut off.

Therefore, in one aspect this invention comprises a wireless leak alarm, and wireless valve, apparatus, comprising:
(a) at least one wireless leak alarm device, said at least one wireless leak alarm device comprises at least one first microcontroller, at least one first wireless communication module, at least one leak sensor adapted to detect a leak of a substance, at least one battery, and at least one fluid leak broadcast means;
(b) said at least one first microcontroller adapted to receive a signal from said at least one leak sensor; and
(c) said at least one first wireless communication module adapted to receive a signal from said at least one first microcontroller, whereby said at least one first wireless communication module transmits an electronic message to one of at least one user and a monitor server via at least one first wireless communication network, whereby said at least one user wirelessly communicates user's instructions to exercise control over at least one action device using said at least one first wireless communication network, wherein said at least one action device comprises a power module, a second wireless communication module, a second microcontroller, a relay, and at least one electrical valve, and wherein said relay transmits at least one electrical signal to said electrical valve upon receipt of instructions from said at least one user, and upon completing said at least one user's instructions said wireless communication module sends an acknowledgement of completion of said at least one user's instructions to said at least one user using said at least one first wireless communication network.

In another aspect this invention comprises a method of remotely exercising control over an electrical valve comprising the steps of:
(a) positioning at least one wireless leak alarm device having at least one first microcontroller, at least one first wireless communication module, at least one leak sensor adapted to detect a leak of a substance, at least one battery, and at least one fluid leak broadcast means, in a location amenable to detecting leaks;
(b) receiving a notification of a leak from one of said at least one wireless leak alarm device via said at least one first wireless communication module via at least one first wireless communication network; and
(c) communicating instructions from one of at least one user and monitor server using said at least one first wireless communication network to a second microcontroller via a second wireless communication module to exercise control over an electrical valve, whereby causing said electrical valve to be shut off to stop said leak, and upon completing said at least one user's instructions said second wireless communication module sends an acknowledgement of completion of said at least one user's instructions to said at least one user using said at least one first wireless communication network.

BRIEF DESCRIPTION OF THE DRAWINGS

Although the scope of the present invention is much broader than any particular embodiment, a detailed description of the preferred embodiment follows together with drawings. These drawings are for illustration purposes only and are not drawn to scale. Like numbers represent like features and components in the drawings. The invention may best be understood by reference to the ensuing detailed description in conjunction with the accompanying drawings.

DETAILED DESCRIPTION

Figure 1A:
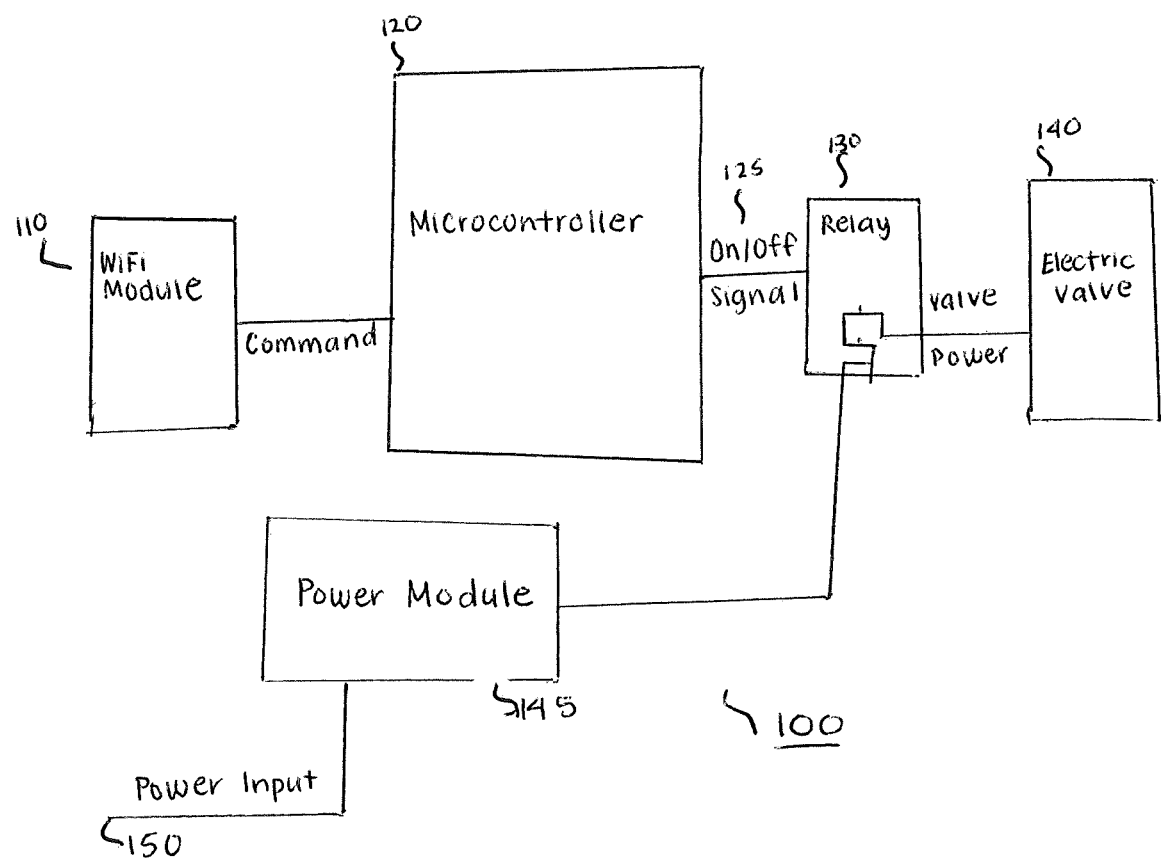
FIG. 1A, is an exemplary block diagram of an exemplary embodiment of the present invention.

The inventive wireless leak alarm, and wireless valve, apparatus, system, and a method thereof will now be discussed with reference to FIGS. 1A through 14. Although the scope of the present invention is much broader than any particular embodiment, a detailed description of the preferred embodiment follows together with drawings. These drawings are for illustration purposes only and are not drawn to scale. Like numbers represent like features and components in the drawings.

At the outset, and as previously stated, it is understood that aspects of the present invention may be implemented with leak detectors for any type of liquid, gas, or solid. For example, aspects of the present invention may be used with carbon monoxide detectors, carbon dioxide detectors, temperature detectors, smoke detectors, etc. Aspects of the present invention may be used in any environment, and any location, indoors and/or outdoors.

In one exemplary embodiment, a leak detector and monitor assists property owners, such as, for example, residential, industrial, governmental, military, restaurant, hospital, medical, and any commercial building, to remotely monitor leak problems, such as, for example, water leaks so that corrective action can be taken to minimize damage to property. In one exemplary embodiment, the malfunctioning water pipe or appliance could be manually shut off after a notification is sent to the user. In another embodiment, the source to the malfunctioning water pipe or the malfunctioning appliance itself can be shut off remotely. In another embodiment, a request for an inspection can be initiated wirelessly as well.

In one exemplary embodiment, a leak detector and monitor is comprised of one or more components. In one exemplary embodiment, a leak detector and alert monitor includes a sensing unit or sensing device (used herein interchangeably). In one exemplary embodiment, a leak detector and alert monitor includes a notification protocol. In one exemplary embodiment, a leak detector and alert monitor includes an action device.

In one exemplary embodiment, the sensing unit includes a leak sensor. The leak sensor may be any type of sensor, such as, for example, a sensor that detects liquid leaks, gas leaks, or solid leaks. In one exemplary embodiment, the leak sensor is a water leak sensor. In one exemplary embodiment the leak sensor is a CO leak sensor.

In one exemplary embodiment, the sensing unit includes a microcontroller. In one exemplary embodiment, the microcontroller is a computer on a single integrated circuit containing a processor core, memory, and programmable input/output peripherals. Program memory in the form of Ferroelectric RAM, NOR flash or OTP ROM is also often included on chip, as well as a typically small amount of RAM. In one exemplary embodiment, the microcontroller is designed for embedded applications. In one exemplary embodiment, the microcontroller is used to automatically control various devices, products and processes. In one exemplary embodiment, mixed signal microcontrollers integrate analog components needed to control non-digital electronic systems, such as, for example, a valve. In one exemplary embodiment, the microcontroller contains at least one general purpose input/output pin (GPIO). GPIO pins are software configurable to either an input or an output state. When GPIO pins are configured to an input state, they are often used to read sensors or external signals. Configured to the output state, GPIO pins can drive external devices such as LEDs, valves, etc. Many embedded systems need to read sensors that produce analog signals. This is the purpose of the analog-to-digital converter (ADC). Since processors are built to interpret and process digital data, i.e. 1s and 0s, they are not able to do anything with the analog signals that may be sent to them by a device. The ADC is used to convert the incoming data into a form that the processor can recognize. A less common feature on some microcontrollers is a digital-to-analog converter (DAC) that allows the processor to output analog signals or voltage levels. In addition to the converters, many embedded microprocessors include a variety of timers as well. One of the most common types of timers is the Programmable Interval Timer (PIT). A PIT may either count down from some value to zero, or up to the capacity of the count register, overflowing to zero. Once it reaches zero, it sends an interrupt to the processor indicating that it has finished counting. This is useful for devices such as thermostats, which periodically test the temperature around them to see if they need to turn the air conditioner on, the heater on, etc.

In one exemplary embodiment, once the water leak sensor detects water, by way of, for example, an alert signal, a microcontroller will cause the notification protocol to notify the home owner or representative, such as, for example a call center, or a property manager, or a family friend or neighbor, to be notified immediately and a record of that event will be logged. In one exemplary embodiment, the notification protocol may also initiate other exemplary methods to communicate the detection of the water, such as, for example, sending an alert email, sending a text message, calling a property manager, friend or neighbor, and/or sending a notification to the owner's smart phone, or tablet. In one exemplary embodiment, the notification protocol causes a flashing light or some other visual notification at the unit to alert the property occupant. In one exemplary embodiment, the notification protocol may cause a sound notification at the unit, such as a large or blaring alarm to alert the responsible parties. In one exemplary embodiment, the notification protocol communicates to the responsible party by way of an email, text message, phone message, or other electronic form of communicated message, with the property manager, friend or neighbor, and/or property owner, or person residing at the dwelling, such as, for example an occupant. In one exemplary embodiment, the notification protocol notifies someone who is remote at the time of the leak.

In one exemplary embodiment, the notification protocol includes any form of data communication that is transmitted from a device to the user's device or vice versa. In one exemplary embodiment, the notification from a device to an Internet cloud based server(s), such as, for example, an email server, text message server, a data monitoring server, or any other electronic communication server, or a local area network (LAN) server by way of a networking protocol using TCP/UDP or secure encrypted protocols. In one exemplary embodiment, once the Internet cloud based server or LAN server receives the communication from the device, the Internet cloud based server or LAN server transmits the interpreted communication, with or without further instructions, to the user's device, such as a smart device, be it a smart phone, mobile computer, computer, laptop, or any other computer device. In one exemplary embodiment, the notification protocol is transmitted from a leak alert device. In one exemplary embodiment, the notification protocol is transmitted from a sensor device associated with a leak alert device.

FIG. 1A, is an exemplary block diagram of an exemplary embodiment of the present invention, showing an exemplary configuration of an action device 100, or smart valve 100, or WiVA (Wireless Valve Access) 100. In one exemplary embodiment, action device 100, enables at least one user 123, shown in FIG. 1B, to remotely "turn off" the action device 100, to stop the leak. In one exemplary embodiment, when a user 123, attempts to remotely shut off a valve from his/her electronic device 160, such as, for example, computer 160, tablet 160, smartphone 160, laptop 160, as more clearly shown in FIG. 1B, a "turn off" command will be sent to the selected action device 100, associated with that particular valve by way of a networking protocol using TCP/UDP or secure encrypted protocols. A Wi-Fi module 110, on the action device 100, will receive the command, and forward, it to a microcontroller 120. In one exemplary embodiment, the Wi-Fi module 110, and the microcontroller 120, may be integrated into a single module. The microcontroller 120, will interpret the command, and switch an associated pin 125, "off" by pulling down its voltage from high to low. In another exemplary embodiment, microcontroller 120, will interpret the command, and switch an associated pin 125, off by transmitting an electrical signal. This pin 125, is connected to a relay or transistor 130, and switching the pin 125, to "off" state results in switching off the relay or transistor 130. The power to an electro-mechanically operated valve 140, such as, for example, a solenoid valve 140, is looped through the relay or transistor 130, and by turning off the relay via a power module 145, to the valve will be disconnected or powered off. In one exemplary embodiment, the WiFi module 110, microcontroller 120, and relay 130, are connected, and/or powered up to the power module 145. The power module 145, is connected to a power input 150. In one embodiment, power input 150, is an AC/DC input. The embodiment shown in FIG. 1A, is only an exemplary embodiment, and the arrangement of the various modules and components may be rearranged in any manner to suit the purposes of the action device 100. Thus, it should be appreciated that the action device 100, is secured to the fluid conduit 19, and wherein at least a portion of an electrical valve 140, of the action device 100, is inside the fluid conduit 19, so as to control the flow of the fluid 18, and even to stop the flow of the fluid 18, when commanded by a user 123.

Figure 1B:
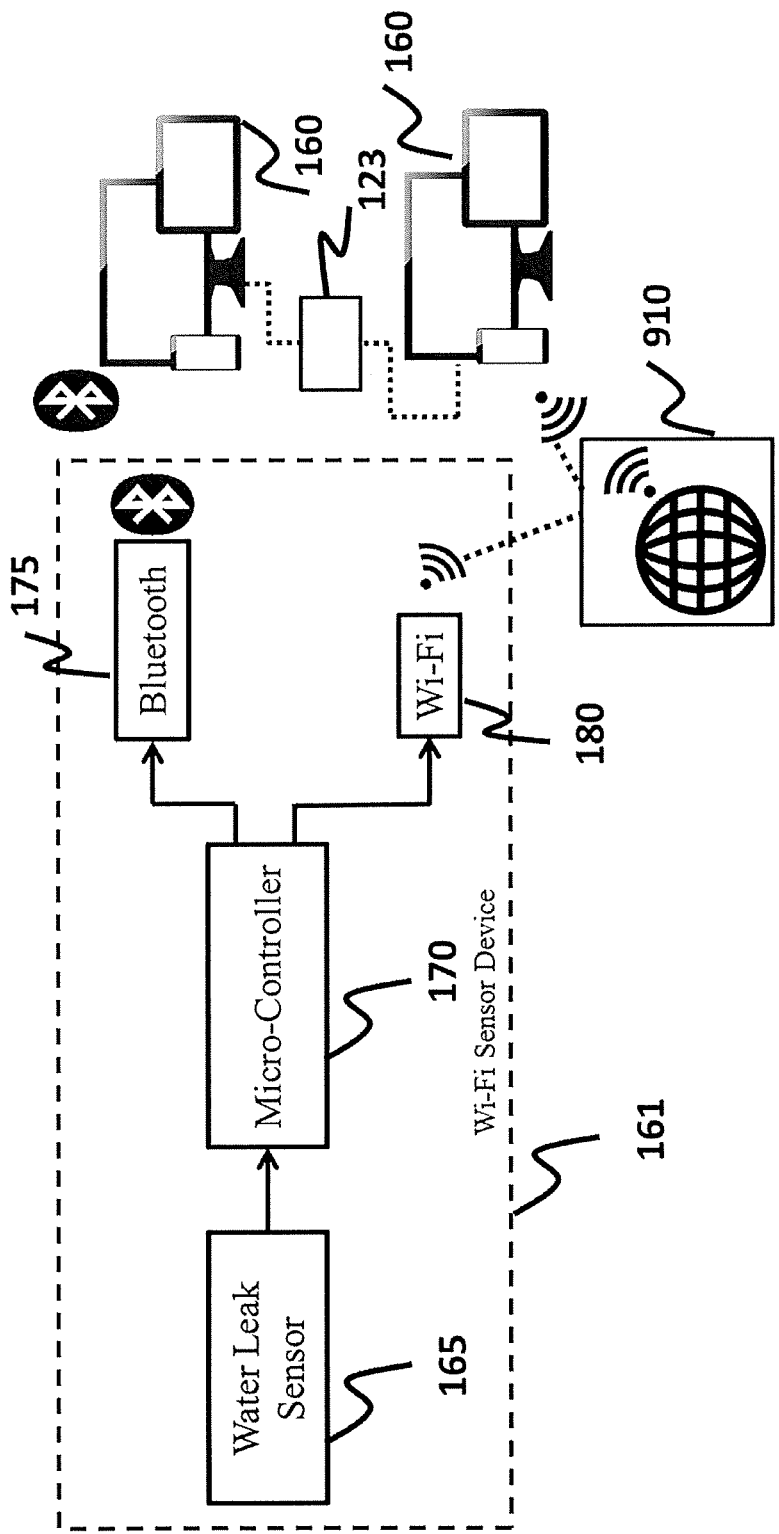
FIG. 1B, depicts an exemplary bock diagram of an exemplary embodiment of the present invention.

FIG. 1B, illustrates an exemplary bock diagram of an exemplary embodiment of the present invention. In one exemplary embodiment of a sensing device 161, or WiLA (Wireless Leak Alarm) 161, or smart alarm 161, the home owner or user 123, may login to the leak detector, and alert monitor, anytime, and review the log file, and review the past alerts, to check what event, at what time happened, and take required action, if necessary. The block diagram in FIG. 1B, shows exemplary components of aspects of the leak detector, and monitor, invention, and the data flow, between the sensing device 161, and the user's electronic device 160, such as, for example, computer 160, tablet 160, smartphone 160, laptop 160, to name a few. In one exemplary embodiment, a water leak sensor 165, communicates by way of an electrical signal with a microcontroller 170. Microcontroller 170, electronically communicates with communication protocols, such as, for example, a Bluetooth module 175, or a WiFi module 180. In turn, the Bluetooth module 175, or the WiFi module 180, communicates with the user's computer, tablet, smartphone, or laptop 160, via notification protocols, such as, for example, an Internet server, cloud, LAN server or directly through point-to-point communications.

In one exemplary embodiment essential and optional elements of the leak detector and monitor invention include a water leak sensor, one or more triggers that can generate an indication to the notification protocol unless interrupted by a reset module. In one exemplary embodiment, the trigger(s) is/are also used to disable the notification protocol if desired. Control of the trigger is done either by user input or, optionally, a central monitor and control element through a notification protocol. In one exemplary embodiment, an optional position locator module may report location information with the indication from the water leak sensor to the messaging module.

In one exemplary embodiment, a notification protocol provides information exchange between aspects of the leak detector and monitor invention and the user. It also requests and merges information from the optional position locator module which can be a Global Positioning System (GPS) unit or similar technology. The reset can take input from the user or the system either directly or through the notification protocol.

In one exemplary embodiment, the user interface would typically be implemented as a physical interface not limited to dedicated push buttons, programmable buttons, motion detectors, physiological, and sound detection and generation devices, or display indications.

In one exemplary embodiment, the leak detector and monitor invention may be implemented as a stand-alone portable remote unit with an RF interface or implementation on portable computing platforms such as PDA's or laptop computers, or GPS guidance systems or car help systems (such as, for example, General Motors' OnStar® system) that may be carried/used by at risk individuals. Network based services could also use this technology as where the trigger and reset are provided through the messaging module from the central monitoring and control element.

In one exemplary embodiment, user interface may be via one or more keys on the portable device. Alternative input methods include but are not limited to voice recognition, unit movement (iPhone—e.g. shake, invert, etc.) and touch screens. In one exemplary embodiment, the RF messaging is a cellular system. However, many other RF systems can enable this invention including any combination of satellite, WiFi, WiMax, PMR, Bluetooth and special purpose radio.

Bluetooth, and WiFi, are the two exemplary and preferable means to connect to both the sensing device, and the action device, wirelessly. Bluetooth enabled devices, such as, smartphones, can discover, and connect, to both sensing, and action, units, within the signal range. Custom built applications on the smart device can configure, monitor and send commands to the device(s). In one exemplary embodiment, WiFi is another method to connect the sensor devices, and the action devices. All devices on the same network can detect Wi-Fi leak alert units and take advantage of custom designed applications, which the user 123, can configure, monitor and send commands to the device(s). Moreover, WiFi enabled leak alerts can be accessed remotely from the Internet 910, providing many advantages to the user 123. For example, the user 123, can shut off the leaking pipe remotely (e.g. from work, or even when away on a trip).

Figure 2:
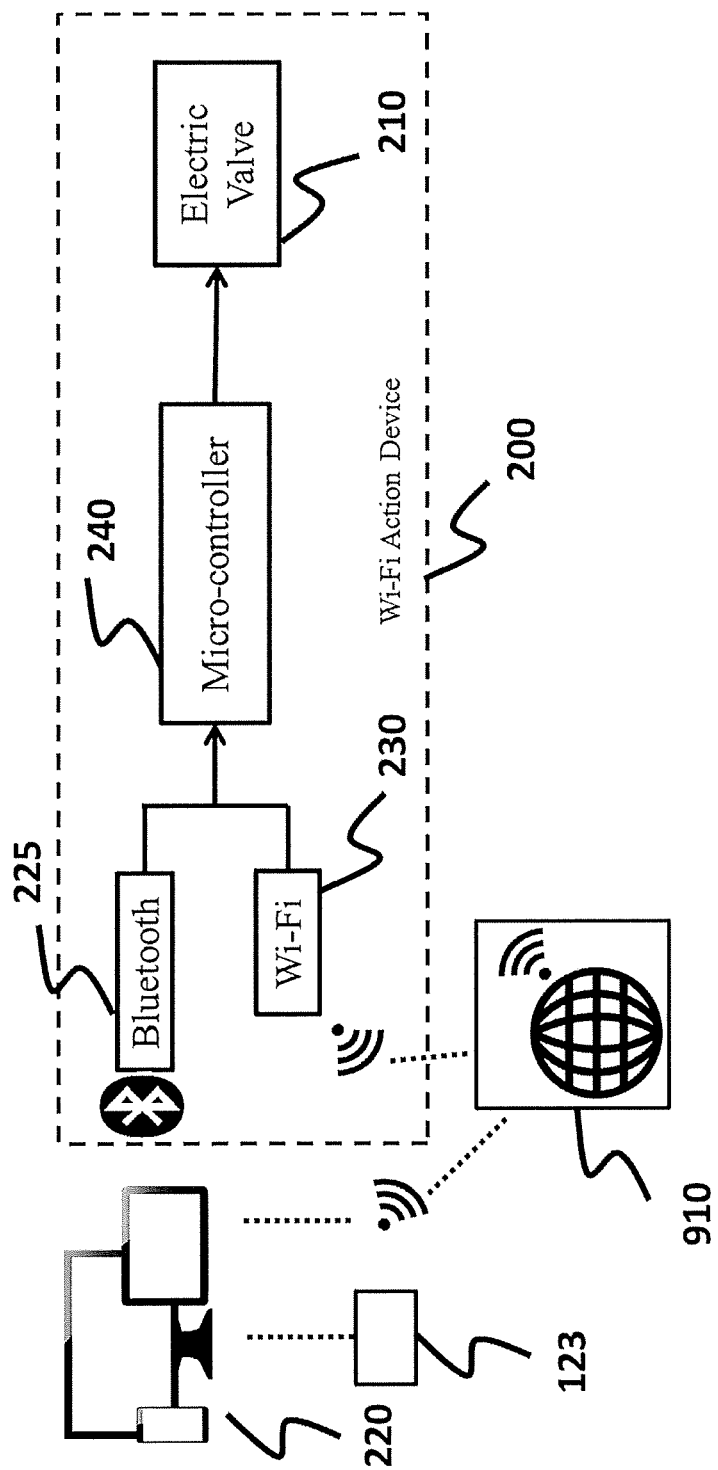
FIG. 2, depicts an exemplary block diagram of an exemplary embodiment of the present invention.

FIG. 2, illustrates an exemplary block diagram of an exemplary embodiment of the present invention, showing an action device 200, or smart valve 200, or WiVA (Wireless Valve Access) 200, or action unit 200, (used interchangeably herein), of the present invention. In one exemplary embodiment, when an action device 200, is placed in a water supply system, an electronic valve 210, such as, for example, a solenoid valve 210, can be placed in the pipeline 19, or the water supply system 19, or a fluid conduit 19, as more clearly shown in FIG. 11. This electrical valve 210, can be controlled remotely through smart applications, phone calls, text message or webpage by accessing an integrated webserver on the action device 200. The block diagram in FIG. 2, illustrates exemplary components of a water leak sensor device and data flow between aspects of the leak detector and monitor invention and the user's electronic device 220, such as, for example, computer 220, tablet 220, smartphone 220, laptop 220, to name a few. In one exemplary embodiment, the user's computer, tablet, smartphone, or laptop 220, communicates wirelessly, with, for example, Bluetooth 225, or WiFi 230. The user's signal is processed in a microcontroller 240, which then communicates with electric valve 210. In this manner, the user 123, is able to wirelessly control the electric valve 210, from, for example, a remote location. In another exemplary embodiment, the user 123, is able to wirelessly shut off electric valve 210.

In one exemplary embodiment, once a water leak is detected, an alert will be sent to the user or a list of users describing what pipe (or appliance) and at what time had a leak problem. The user then can send a message back to give a command to the device for instance, to shut off the valve supplying water to the leaking pipe (or appliance). In one exemplary embodiment, once a water leak is detected, an alert will be emailed to the user or a list of users describing what pipe (or appliance) at what location and at what time had the problem. In one exemplary embodiment, when an alert occurs, all smart devices configured and paired with aspects of the leak detector and monitoring invention (whether running the iOS or Android operating system) will receive a push notification pop up on their screens showing the alert. The user then may launch the monitoring/action application to see the event details and take the required action(s). For instance, the user may shut off the corresponding control valve (if available) or call a friend or technician to check the pipe. In one exemplary embodiment, each Wi-Fi water leak detector will have an embedded webserver that monitors the events and logs them. This webserver can be used to configure a device or number of the devices on the network. Moreover, this webserver can control electronic valves if required. In one exemplary embodiment, whether using a text message, phone call, smart device app or embedded webserver, there is always a two-way communication between the end user and the Wi-Fi sensor or action unit. The block diagram in FIG. 3 illustrates an exemplary data flow from aspects of the leak detector and monitor invention to the user's device and from the user's device to the action device.

Figure 3:
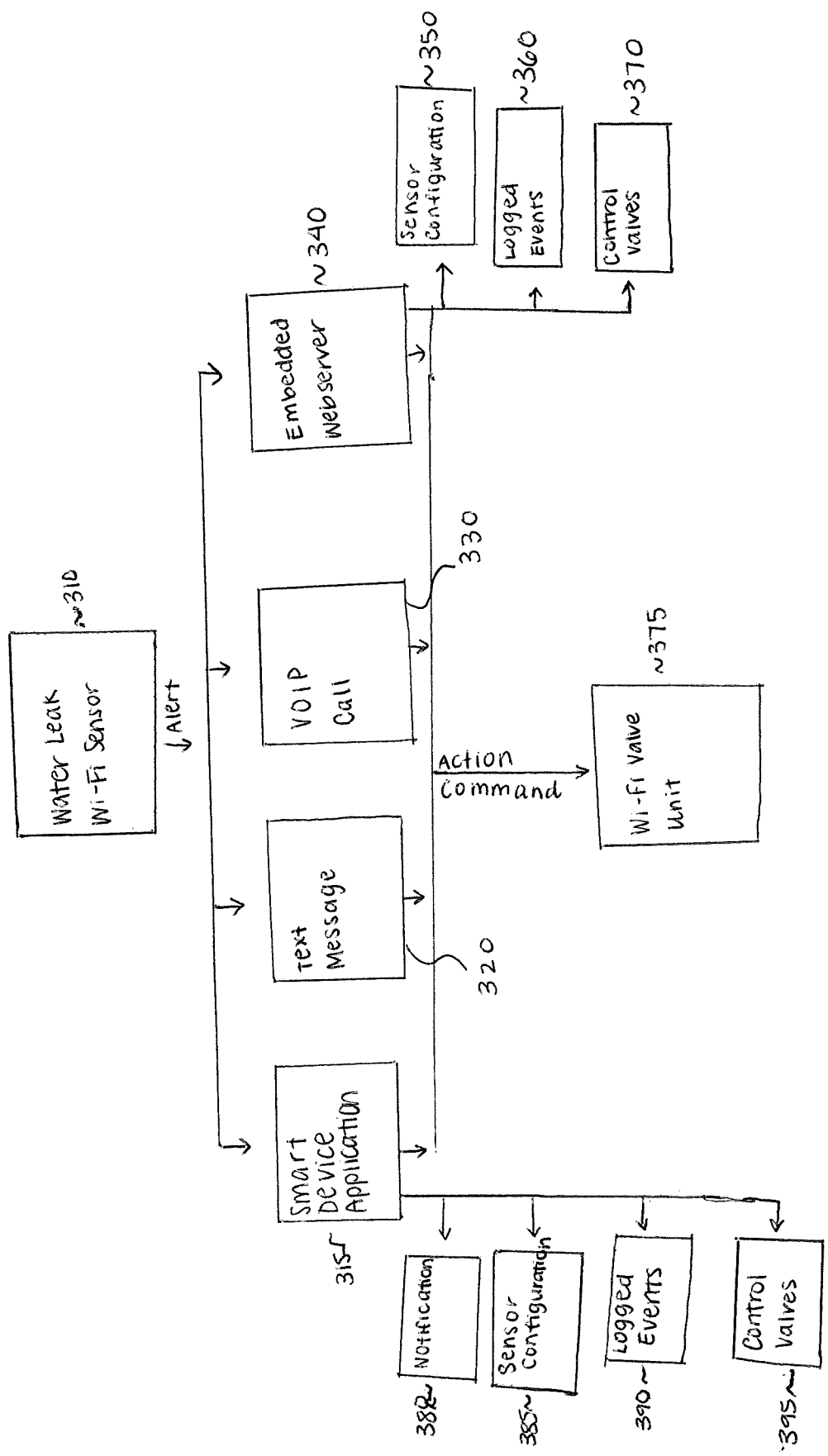
FIG. 3, depicts an exemplary block diagram of an exemplary embodiment of the present invention.

FIG. 3 illustrates an exemplary block diagram of an exemplary embodiment of the present invention, where the inventive water leak sensor, microcontroller, and Wi-Fi module, can be integrated into one module, such as, for example, the WiFi Leak Sensor 310, or WiLA (Wireless Leak Alarm) 310, or smart alarm 310. In one exemplary embodiment, the user 123, can communicate with the WiFi Leak Sensor 310. Once activated, WiFi Leak Sensor 310, communicates, for example, an alert message, to the user's smart device application 315. Smart device application 315, includes, for example, but not limited to, sensor configurations 385, that includes, networking configurations, that enable the smart device application 315, to connect to a network hub, such as, an access point or router, that enables wireless communication. Sensor configurations 385, may also include, but not limited to, date setting, unique identifications, user information, etc., so that smart device application 315, can communicate with one or more users 123. Smart device application 315, may also include alert notifications 380, to signal the user 123, that the leak sensor 310, has detected leakage. In another embodiment, smart device application 315, may include, a logged events feature 390, which records past events, such as, leak detection, power status, etc. In one exemplary embodiment, smart device application 315, could include, control valve instructions 395, that enables the user(s) 123, to remotely communicate with WiFi Valve Unit 375, or WiVA (Wireless Valve Access) 375, or smart valve 375. In one exemplary embodiment, an electronic valve, microcontroller, and a WiFi module are integrated into a single module, such as a WiFi Valve Unit 375.

In one exemplary embodiment, as illustrated in FIG. 3, the Wi-Fi Leak Sensor 310, could also include the ability to communicate with the user(s) 123, via any form of notification protocols, such as, for example, text 320. In one exemplary embodiment, Wi-Fi Leak Sensor 310, could include the feature of sending VOIP phone message 330, when WiFi Leak Sensor 310, detects leakage. In this exemplary embodiment, the user(s) 123, may respond via VOIP 330, and instruct the action device 375, to shut down. In one exemplary embodiment, a Wi-Fi Leak Sensor 310, could include an embedded webserver 340, which could have a sensor configuration 350, to monitor events 350, and log events 360, configure a device or number of the devices on the network, and/or controls valves 370. In one exemplary embodiment, the user 123, can communicate with the action unit 375. Once the user 123, receives one or more notifications, such as, for example, notifications 320, and/or 330, the user 123, can use embedded webserver 340, so that the valves may be controlled, and/or shut ON or OFF remotely.

Figure 4:
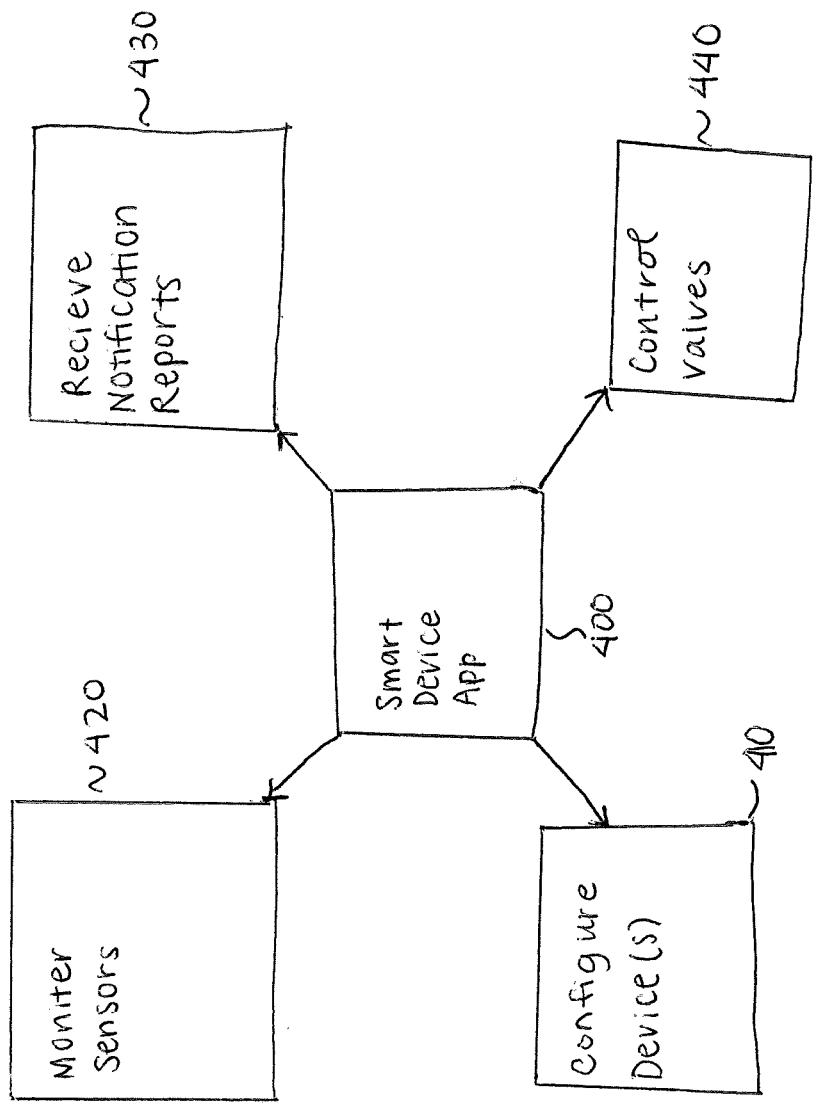
FIG. 4, depicts an exemplary block diagram of an exemplary embodiment of the present invention.

FIG. 4, illustrates an exemplary block diagram of an exemplary embodiment of the present invention using the inventive smart device applications. In one exemplary embodiment, applications will be available for Android, iOS or windows mobile devices 160, 220. These applications are responsible for delivering water leak alerts to a user 123. Additionally, these applications enable a user 123, to configure, monitor and/or control action devices 100, 200, remotely. In one exemplary embodiment, smart device application 400, includes enhanced user 123, interaction features, such as, for example, device configuration features 410, monitor sensors 420, notifications alerts 430, and control over valves 440. These exemplary enhancements enable the user 123, to remotely be informed of the status of the leak alert sensors 161, 310, and interact with the remote electric valve 140, 210.

Figure 5:
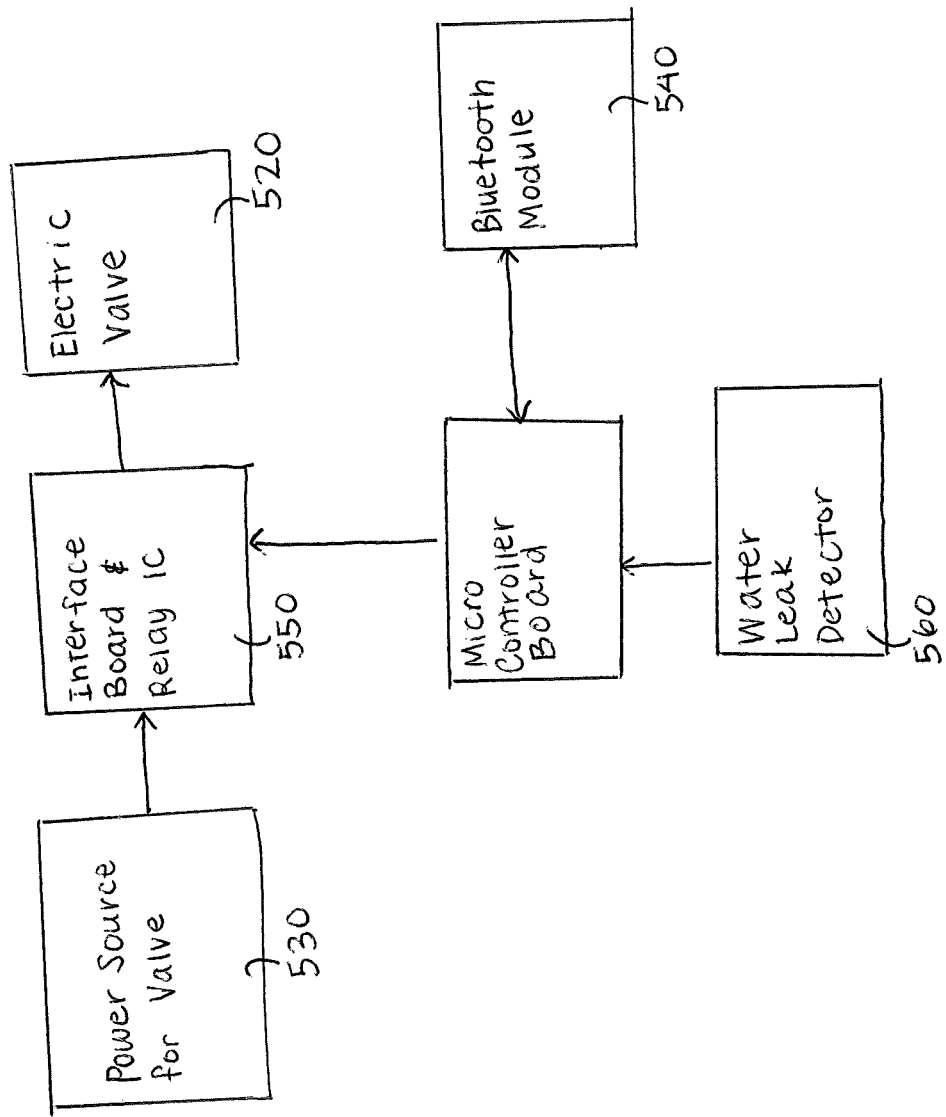
FIG. 5, depicts an exemplary block diagram of an exemplary embodiment of the present invention.

FIG. 5, depicts an exemplary block diagram of an exemplary embodiment of the present invention. In the exemplary embodiment, the following optional components are shown, a microcontroller board 510, an electric valve 520, a power source for the valve 530, a Bluetooth module 540, an interface board/relay IC 550, and a fluid leak detector 560. In one exemplary embodiment, microcontroller 510, Bluetooth module 540, Interface board/relay IC 550, are all housed with leak detector 560. In one exemplary embodiment, once leak detector 560, detects a leak, it communicates to a smart device, such as, for example, device 160, 220. The user 123, can then respond, and provide necessary instructions from his smart device 160, 220, to the microcontroller 510, which then instructs electric valve 520, to shut ON or OFF.

In one exemplary embodiment, the leak alert and monitor system includes at least one leak alert sensor, at least one microcontroller, and a WiFi module and/or Bluetooth or any other form of wireless communication module housed in single casing to form, for example, a WiFi Sensor Device or Sensor Device. In one exemplary embodiment, an electronic valve, a microcontroller and WiFi and/or Bluetooth or any other form of wireless communication module is housed in a WiFi Action Device or Action Device. In one exemplary embodiment, the Sensor Device and the Action Device are either wirelessly or physically connected to transmit and receive electronic signals to exercise control over at least one electronic valve. In one exemplary embodiment, an electronic valve is physically connected to the microcontroller housed within the Sensor Device to receive and transmit electronic signals.

Figure 6:
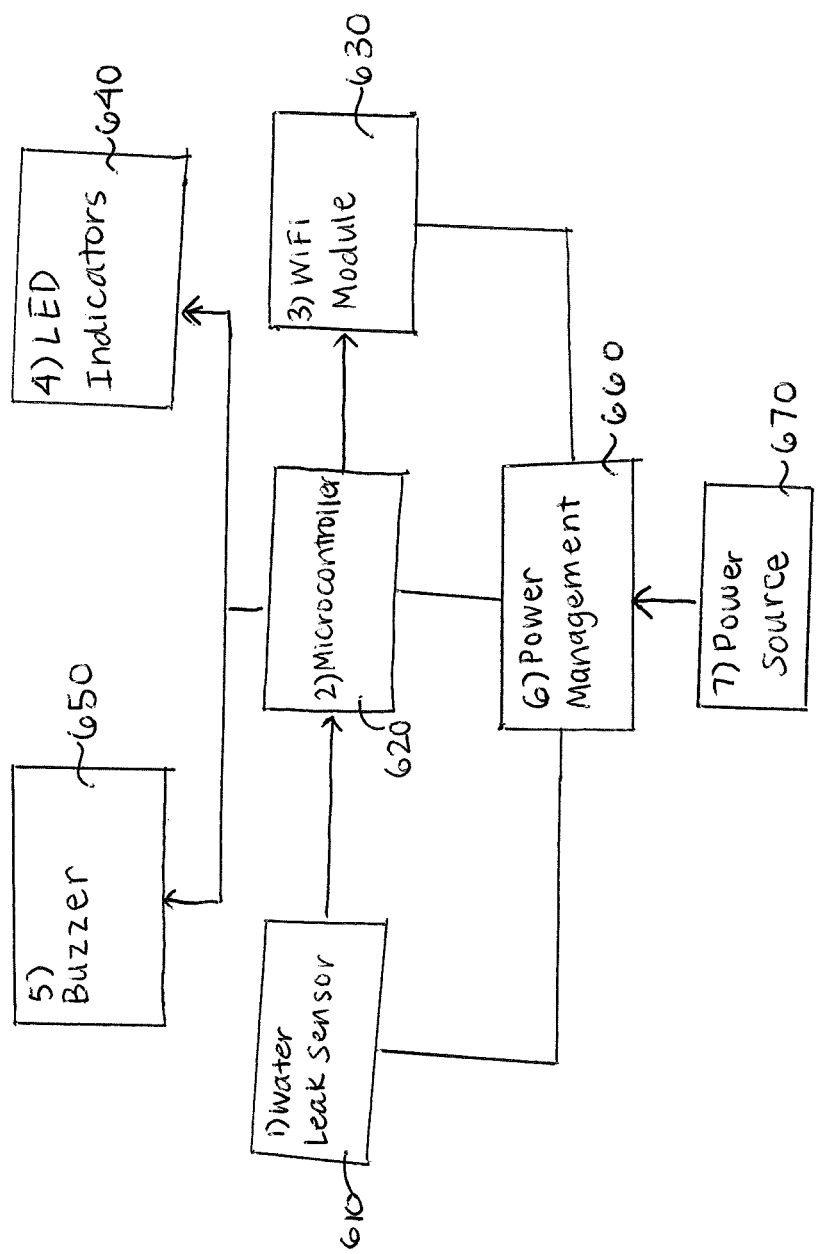
FIG. 6, depicts an exemplary block diagram of an exemplary embodiment of the present invention.

FIG. 6 depicts an exemplary block diagram of an exemplary embodiment of the present invention. In one exemplary embodiment, aspects of the present invention include the following exemplary components: a leak sensing unit 610, or WiLA (Wireless Leak Alarm) 610, or smart alarm 610, a microcontroller 620, a WiFi module or Bluetooth 630, a notification protocol that includes, for example, an LED indicator 640, or other notifying element, such as, for example, a buzzer 650, speaker 650, or other similar noise making device 650, a power management system (PMS) 660, and a power source 670. In one exemplary embodiment, the purpose of the PMS 660, is to provide and maintain required power input for each component feature.

Figure 7:
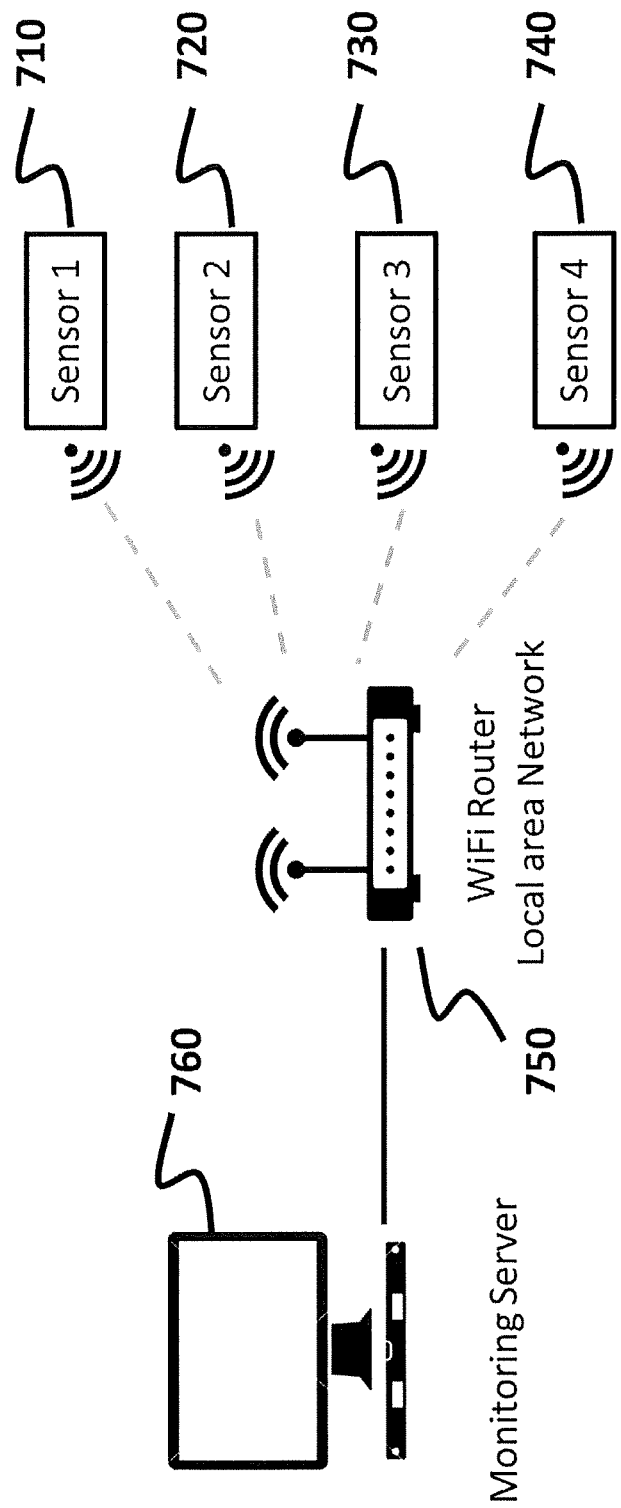
FIG. 7, depicts an exemplary diagram of an exemplary embodiment of the present invention.

FIG. 7, depicts an exemplary diagram of an exemplary embodiment of the present invention, showing how one or more sensors 710, 720, 730, 740, are connected to a network 750. There could be more than one WiFi router 750, or access point 750, in this configuration. In one exemplary embodiment, sensors 710, 720, 730, and 740, are wirelessly connected to the WiFi Router LAN (Local Area Network) 750. In this example, only four (4) sensors are shown, however, there can be any number of sensors. WiFi Router LAN 750, is connected to monitoring server 760, which enables the user 123, to organize, monitor, and configure, any number of sensors 161, 310, 610, from a minimal number of user interfaces.

Figure 8:
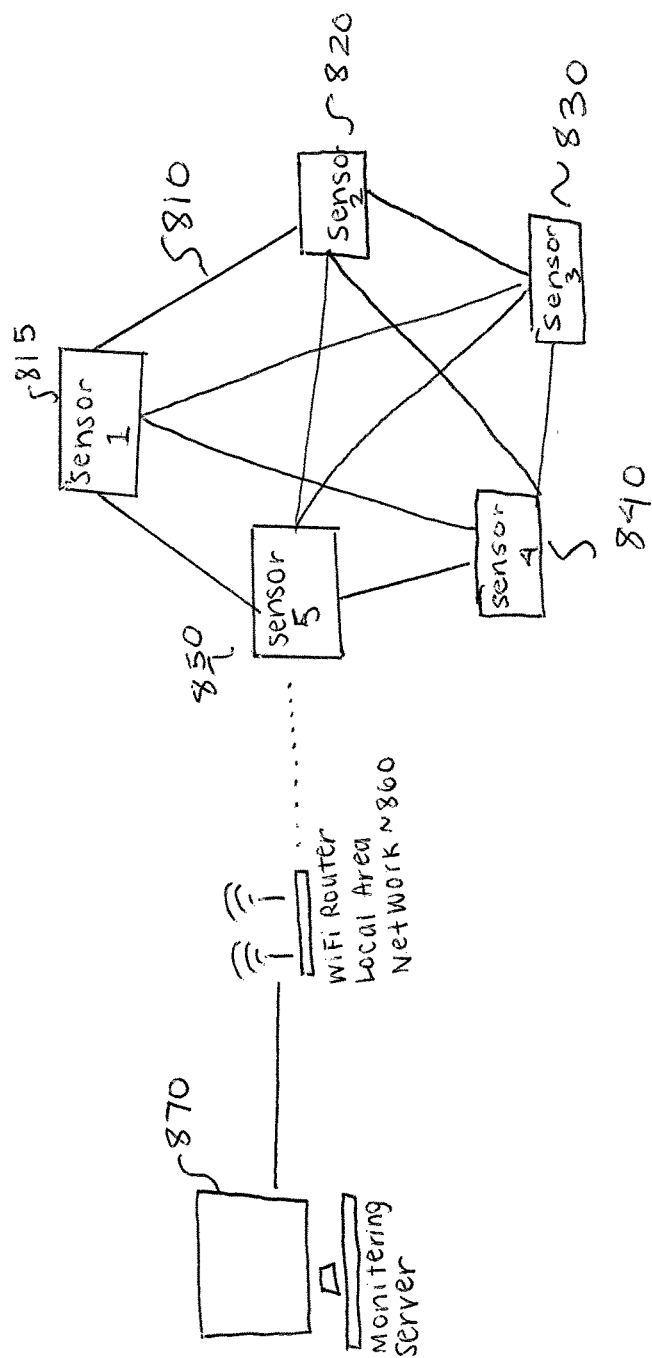
FIG. 8, depicts an exemplary diagram of an exemplary embodiment of the present invention.

FIG. 8, depicts an exemplary diagram of an exemplary embodiment of the present invention. As illustrated in the exemplary embodiment in FIG. 8, an exemplary mesh network 810, configuration showing that all WiFi sensor alarms 815, 820, 830, 840, 850, or WiLA (Wireless Leak Alarm) 815, 820, 830, 840, 850, or smart alarm 815, 820, 830, 840, 850, are on the same network 860, and can be setup as a part of a mesh network 810, to improve the WiFi signal strength, and cover possible dead spots, such as, for example, in a building. Just like local area network (LAN) configuration explained previously, sensors 815, 820, 830, 840, and 850, on a mesh network 810, are connected to a wireless access point hub or router 860, to communicate with at least one monitoring server 870. FIG. 8, which illustrates an exemplary mesh network 810, configuration, having only five (5) sensors 815, 820, 830, 840, 850, however, there can be any number of leak sensors, or smart alarms. Wireless access point hub 860, is connected to at least one monitoring server 870, which enables the user 123, to organize, monitor, and configure any number of leak sensors from a minimal number of user interfaces.

Figure 9:
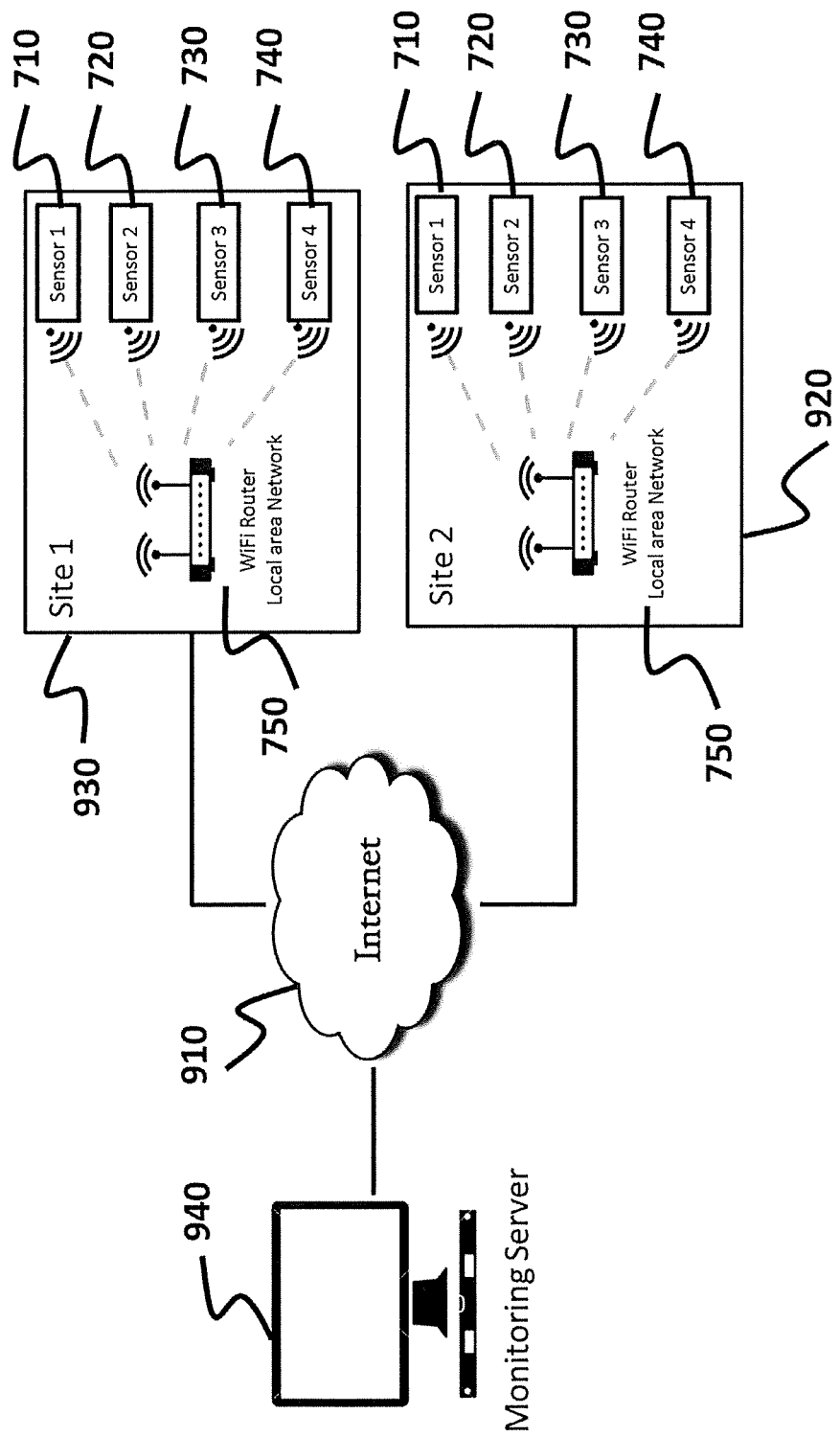
FIG. 9, depicts an exemplary diagram of an exemplary embodiment of the present invention.

FIG. 9, depicts an exemplary diagram of an exemplary embodiment of the present invention. In another exemplary way to monitor WiFi water leak sensor alarms 920, 930, or WiLA (Wireless Leak Alarm) 920, 930, or smart alarm 920, 930, having a plurality of sensors, can be installed, such as, in a large facility, remotely through, for example, an Internet connection 910, or cloud services 910. In this method multiple locations 920, 930, can be added to one central system, and an administrator will be able to monitor all sites at the same time or in real time or from multiple locations. In this configuration the monitoring software can be installed on a remote site computer (i.e. a monitoring center) 940, to monitor multiple locations, and facilities, at the same time with a unified system. For example, an organization may manage more than one hospital, thus the monitoring server 940, can be located somewhere else other than the hospitals' locations (i.e. in organization's headquarter). FIG. 9, further shows an exemplary remote site(s) monitoring using the Internet 910, or cloud connection 910, for a plurality of locations, and plurality of fluid leak sensors, but being managed or monitored all from a single or a master location. In this example, only two (2) sites 920, 930, are shown, however, there can be any number of sites. The monitoring server 940, is shown connected to the Internet 910, or cloud services 910, which enables the user 123, to organize, monitor, and configure any number of sites 920, 930, from a minimal number user interfaces. It should be understood that each sensor site 920, 930, has a plurality of fluid leak sensors, that are communicating with the monitoring server 940, via a wireless communication network 750, such as, for example, a WiFi router 750.

Figure 10:
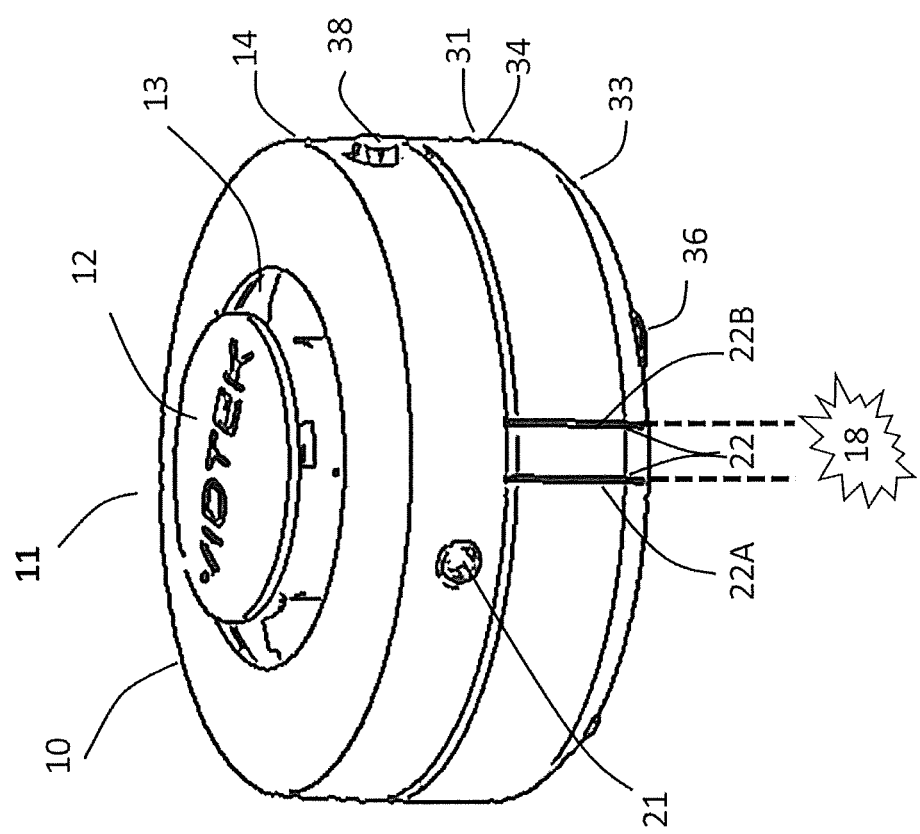
FIG. 10, illustrates an exemplary WiLA (Wireless Leak Alarm) of an exemplary embodiment of the present invention.

FIG. 10, illustrates an exemplary WiLA (Wireless Leak Alarm) 10, of an exemplary embodiment of the present invention. The sensing device 10, or WiLA (Wireless Leak Alarm) 10, or smart alarm 10, basically comprises of an upper housing or top cover 11, a lower housing or base cover 31. The upper housing 11, has preferably a top umbrella shaped cover 12, and an illumination window 13, or an illumination ring 13, and a top cover enclosure 14. The top umbrella shaped cover 12, basically allows for any fluid or liquid that may fall on the sensing device 10, to basically roll-off the upper housing 11, and not accumulate on the top surface of the upper housing 11, which also makes it splash resistance. The illumination window 13, could be clear, transparent, or translucent, as long as the illumination window 13, allows a person or user 123, to be physically be able to see any light that may be originating from inside the smart alarm 10. The lower housing 31, has a bottom case or enclosure 34, having a base or bottom surface 33, and at least one electronic fluid sensor 22. The electronic fluid sensor 22, comprises, for example, at least one first electrode 22A, having a first polarity 22A, and at least one second electrode 22B, having a second polarity 22B, such that when fluid 18, is present and touches both the electrodes 22A, 22B, at the same time, an electronic circuit is established, and current passes through to activate the alarm electronics inside the sensing device 10. The WiLA (Wireless Leak Alarm) 10, also has a leak sensor extension input 21, and a push button 38, which can be used as a reset or setup button 38.

Figure 11:
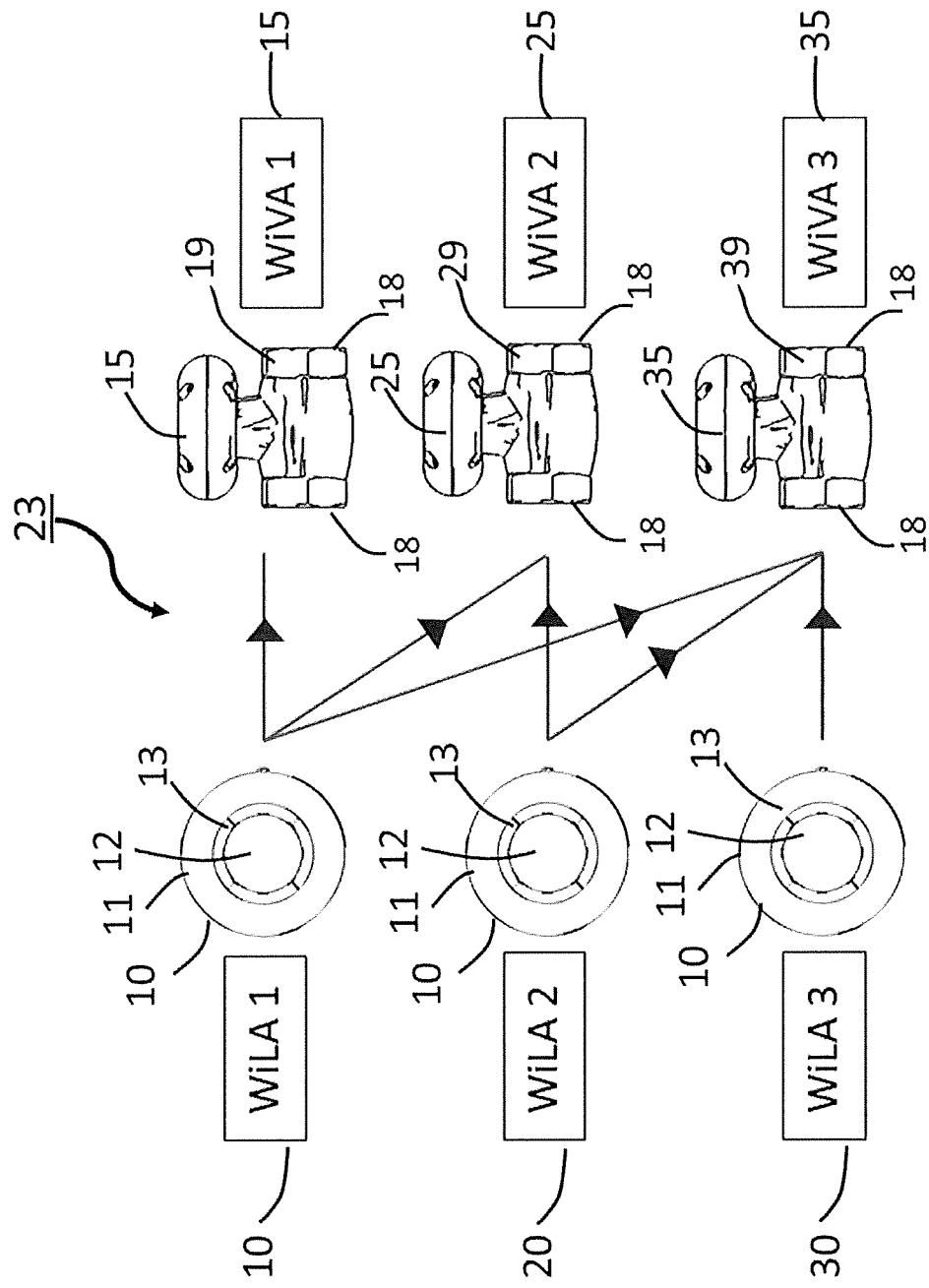
FIG. 11, illustrates an exemplary diagram of an exemplary embodiment of the present invention.

FIG. 11, illustrates an exemplary diagram of an exemplary embodiment of the present invention. As shown in FIG. 11, the invention 23, comprising of WiLA (Wireless Leak Alarm) 10, and a WiVA (Wireless Valve Access) 15, having an electrical valve 140, 210, and which is placed in a fluid stream 18, such as, water 18, air 18, pressurized gas 18, which fluid 18, flows via a conduit 19, such as, a pipe 19. FIG. 11, further shows a plurality of WiLA (Wireless Leak Alarm) 10, 20, 30, and WiVA (Wireless Valve Access) 15, 25, 35, in a network configuration. For example, a user 123, can sync or pair a pair of WiLA 10, and WiVA 15, for automatic action in respond to leak detection via WiLA 10. Furthermore, each WiVA 15, can be synced or paired with multiple WiLAs 10, 20, 30. Similarly, each WiLA 10, can be synced or paired with multiple WiVAs 15. FIG. 11, illustrates several simple combinations of WiLA 10, and WiVA 15, pairing or syncing. For example, one can have three WiLAs 10, 20, 30, and three WiVAs 15, 25, 35, and as one can see that WiLA 10, is paired or synced with all the three available WiVAs 15, 25, 35, but WiLA 20, is only paired or synced with WiVA 25, and 35. WiVA 35, is only paired or synced with WiLA 30, but WiVA 35, is paired or synced with all the three WiLAs 10, 20, 30. It should be understood that one or more number of WiLA's can be paired or synced with one or more number of WiVAs, and vice versa. Thus, as one can appreciate that at least one wireless leak alarm device can be paired or synced with at least two of the action devices, and similarly, at least two of the wireless leak alarm devices can be paired or synced with at least one action device. Such a configuration also creates a redundancy, as well as a back-up mode for the devices.

Thus as one can see from FIG. 11, that WiLA 10, and WiVA IS, can communicate directly with each other, once they are paired or synced, especially, if they are in the proximity of each other. For security reasons, it is preferred to use a unique encrypted protocol which could be initialized during the initial paring of the two units. This point-to-point communication is beneficial when a local network is down for any reason, such as, for example, a power outage or a wireless router failure. Each WiLA 10, preferably keeps a record of paired WiVAs 15, 25, 35, and their private encryption key in its internal memory, and when a leak is detected it transmits a shut OFF signal to the entire paired valve 15, 25, 35. However, a user 123, can disable this feature, if needed.

It should be appreciated that all the paired WiVAs 15, 25, 35, with a user's smart device, can be controlled manually from the Leak Alarm Application on the user's smart device. For example, a user 123, can see the current status of the all paired WiVAs 15, 25, 35, and manually turn them OFF or ON. Similarly, a cloud based service could be used to monitor and control all the configured and registered WiLAs 10, 20, 30, and WiVAs 15, 25, 35, to check if they are online or not.

For some applications all the WiLA 10, 20, 30, and WiVA 15, 25, 35, devices on a given network system could be programmed to, for example, wake up from a sleep mode at a given interval or time, such as, for example, every 24 hours, or 8 AM every day, and transmit a handshake to a server, and provide status information, such as, for example, battery level status. If the server doesn't receive the handshake signal at the expected time or interval, then the server software could assume that there is something wrong with the unit 10, 20, 30, 15, 25, 35, etc., for example, that either the battery 37, is dead, or that there is a network connectivity issue. In such an event, the system would notify the user or administrator 123, to take an action or further look into this matter.

As mentioned earlier that during the status hand shake between WiLA 10, 20, 30, and the cloud server 760, 940, the WiLA 10, 20, 30, could also be programmed to transmit, for example, the current level of the battery 37, to the cloud based sever 940. If the reported battery level of WiLA 10, 20, 30, is too low, it could notify or alert the user 123, to change the battery 37, or take an appropriate action.

There could be a situation where a user 123, was not available when, for example, a notification was sent, such as, for example, a leak notification, or for some reason the user 123, missed the transmitted notification. However, with this invention the WiLA 10, 20, 30, also keeps an event log in its internal memory, along with the log being available on the Internet 910, or on the cloud based server 760, 940, and so it is now possible for a user 123, to get information on the status from a plurality of locations. With the new cloud based logging, now a user 123, can access to all the events from all the paired WiLAs 10, 20, 30, and WiVAs 15, 25, 35, through the App. Similarly, a user 123, can also filter the events log to an event of his/her interest. The inventive app is capable of generating events log report for future reference. The generated report can be printed, exported to a file, or sent as an email attachment, to name a few.

When a user's smart device is connected to the same network as WiLAs 10, 20, 30, or WiVAs 15, 25, 35, it can be easily paired with an existing configured WiLA 10, 20, 30. On the pairing page of the app, it will show all available paired, and unpaired, WiLAs 10, 20, 30, and WiVAs 15, 25, 35. A user 123, can save configuration data on their smart device for quick programming of multiple WiLAs 10, 20, 30, or WiVAs 15, 25, 35. As stated earlier that, preferably, all communication between WiLA 10, 20, 30, WiVA 15, 25, 35, and a sever 760, 940, are encrypted, and secured.

Figure 12:
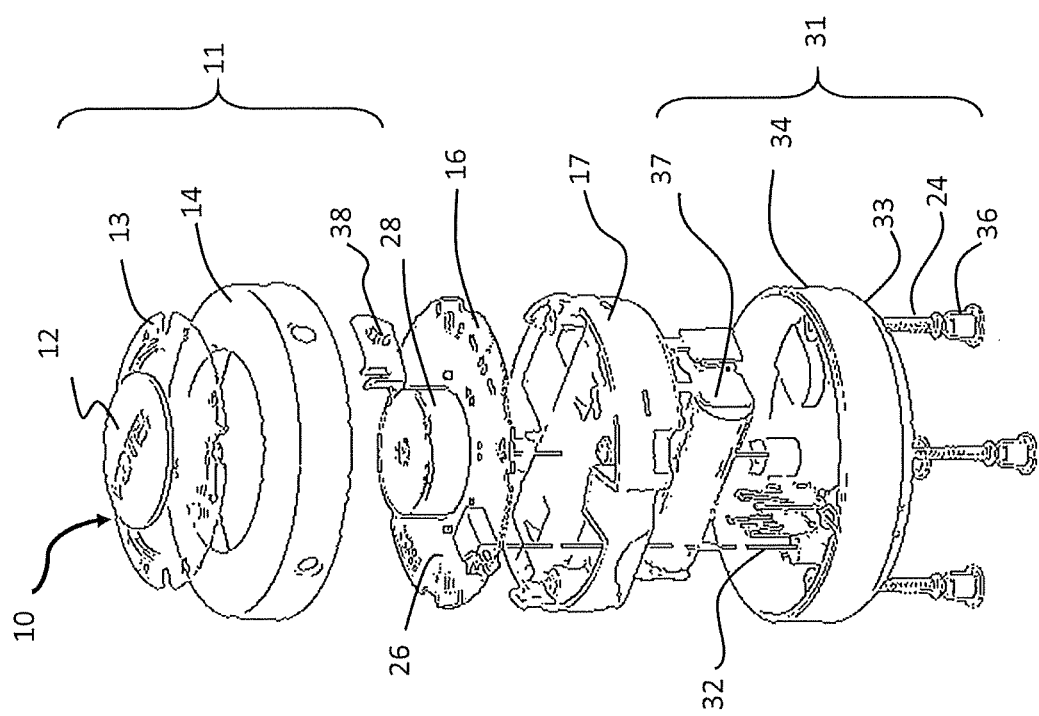
FIG. 12, illustrates an exploded view of an exemplary WiLA (Wireless Leak Alarm) of an exemplary embodiment of the present invention.

FIG. 12, illustrates an exploded view of an exemplary WiLA (Wireless Leak Alarm) 10, of an exemplary embodiment of the present invention. Typically, the sensing device 10, or WiLA (Wireless Leak Alarm) unit 10, or smart alarm 10, basically comprises of an upper housing 11, or top cover 11, which is joined to a lower housing 31, or base cover 31. The upper housing 11, preferably has a top umbrella shaped cover 12, an illumination window 13, or an illumination ring 13, and a top cover enclosure 14. The top umbrella shaped cover 12, basically allows for any fluid 18, or liquid 18, that may fall on the sensing device 10, to basically roll-off the upper housing 11, and not accumulate on the top surface of the upper housing 11, which also makes it splash resistance. The illumination window 13, could be clear, transparent, or translucent, as long as the illumination window 13, allows a person or user 123, to be physically be able to see any light that may be emitting or originating from inside the smart alarm 10. The lower housing 31, has a bottom case or enclosure 34, having a base or bottom surface 33, and at least one electronic fluid sensor 22, or probe 22. The electronic fluid sensor 22, comprises of a first electrode 22A, having a first polarity 22A, and a second electrode 22B, having a second polarity 22B, such that when fluid 18, is present and touches both the electrodes 22A, 22B, at the same time, an electronic circuit is established, and current passes through to activate the alarm electronics inside the sensing device 10. The WiLA (Wireless Leak Alarm) 10, also has a leak sensor extension input 21, and a push button 38, which can be used as a reset or setup button 38. Between the upper housing 11, and the lower housing 31, and inside the WiLA unit 10, there is at least one PCB Board 16, that has secured thereto the necessary electrical components, at least one battery holder 17, to accommodate at least one battery 37, at least one sensor contact 32, that electrically connect with the external leak sensor probes 22, or external electrodes 22, at least one LED 26, and at least one buzzer 28, or a loud sound emitter 28. The upper housing 11, and the lower housing 31, could be secured to each other by means well known in the art, such as, welding, gluing, bayonet type connection, threaded connection, pressure fitted into each other, to name a few. For the purposes of illustration, at least one securing means 24, such as, a screw 24, is used to secure the upper housing 11, to the lower housing 31. For marketing or cosmetic purposes one could also hide the securing means 24, by a hiding means 36, such as, for example, a rubber bumper 36, a screw cap 36, to name a few.

Figure 13:
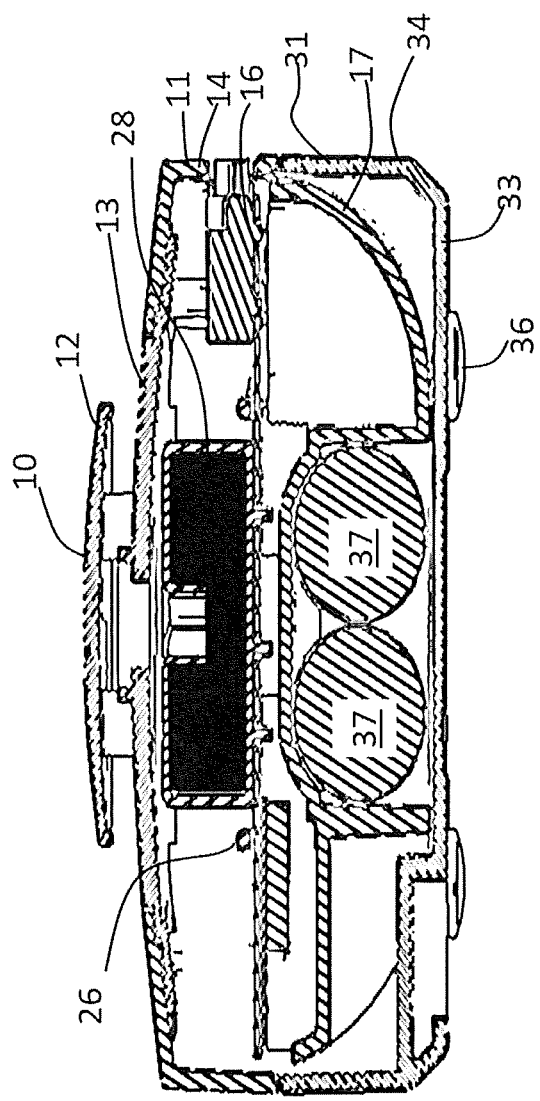
FIG. 13, illustrates a first side cut-away view of an exemplary WiLA (Wireless Leak Alarm) of an exemplary embodiment of the present invention.

FIG. 13, illustrates a first side cut-away view of an exemplary WiLA (Wireless Leak Alarm) 10, of an exemplary embodiment of the present invention. The WiLA unit 10, is shown in an assembled format with the contents securely held between the upper housing 11, and the lower housing 31, and with the upper housing 11, and the lower housing 31, mated or secured to each other.

Figure 14:
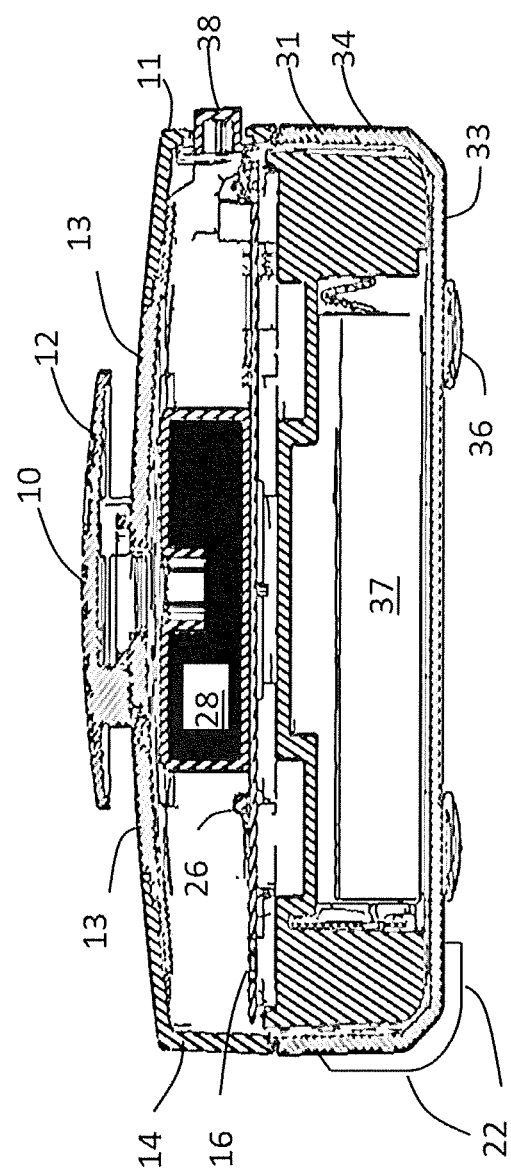
FIG. 14, illustrates a second side cut-away view of an exemplary WiLA (Wireless Leak Alarm) of an exemplary embodiment of the present invention.

FIG. 14, illustrates a second side cut-away view of an exemplary WiLA (Wireless Leak Alarm) 10, of an exemplary embodiment of the present invention in a fully assembled, and operational state. As one can see that at least one of the fluid or leak detecting electrodes 22, are on the side of the housing 11, 31, and the leak detecting electrodes 22, extending onto the outer surface of the base or bottom surface 33, of the lower housing 31. As one can appreciate that a fluid 18, that is leaking would either come in contact with the WiLA unit 10, on the side of the surface 1i, 31, or the base surface 33, and thus each of these two locations would trigger the fluid leak alarm 10, when the leaking fluid 18, comes in contact with the leak detecting probe 22.

Figure 15:
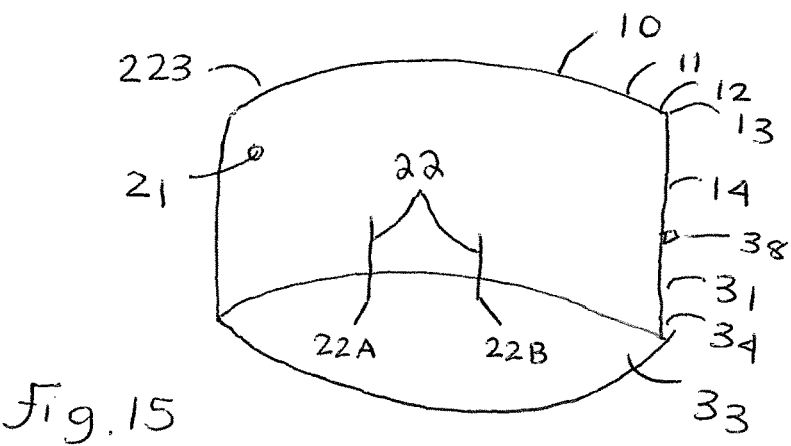
FIG. 15, illustrates an exemplary WiLA (Wireless Leak Alarm) of an exemplary embodiment of the present invention.

FIG. 15, illustrates an exemplary WiLA (Wireless Leak Alarm) 223, of an exemplary embodiment of the present invention. As one can see that the smart alarm 223, or Wireless Leak Alarm 223, or sensing device 223, shown in FIG. 15, is similar to the smart alarm 10, or Wireless Leak Alarm 10, shown in FIG. 10, however, the smart alarm 223, does not have any opening or holes on the bottom surface 33, of the bottom case or housing 34, such that the bottom surface 33, has no openings or cracks for any fluid 18, to enter the inside of the smart alarm 223, via either the bottom surface 33, or the bottom case or housing 34.

Figure 16:
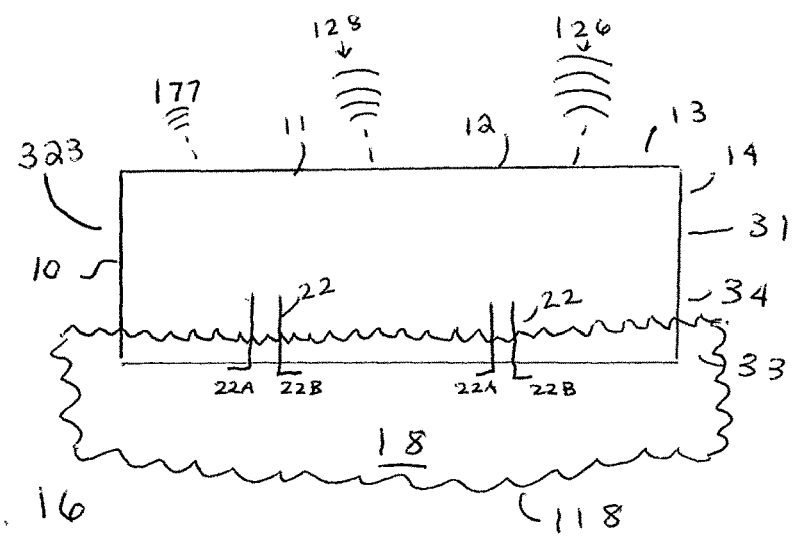
FIG. 16, illustrates an exemplary WiLA (Wireless Leak Alarm) of an exemplary embodiment of the present invention, while floating in a fluid.

FIG. 16, illustrates an exemplary WiLA (Wireless Leak Alarm) 323, of an exemplary embodiment of the present invention, while floating in a fluid 18. As one can see that the smart alarm 323, or Wireless Leak Alarm 323, or sensing device 323, shown in FIG. 16, is similar to the smart alarm 10, or Wireless Leak Alarm 10, shown in FIG. 10, however, the smart alarm 323, is constructed in such a way that when it encounters a fluid leak 18, such as, for example, flooding 18, or a water leak 18, on a floor or ground or surface 118, it does not sink into the leaking fluid 18, or allows the leaking fluid 18, to enter the inside the smart alarm 323, but that it floats above the leaking fluid 18, or flood 18, while the probe 22, is in contact with the leaking fluid 18, and the LED 26, is transmitting or emitting LED light 126, the buzzer or speaker 28, is generating a noise or a buzzing sound 128, and the communication electronics are sending a wireless signal 177, such as, a Bluetooth signal 177, a WiFi signal 177, to name a few. Thus, as one can appreciate that the sensing device 323, operates effectively in a leaking fluid 18, condition, but does not get destroyed, and can be used again and again after the leaking fluid 18, emergency has been addressed. The sensing device 323, is preferably made of a material that is lighter than the fluid 18, so that the sensing device 323, naturally floats under fluid leak or flood conditions. Also, the sensing device 323, either does not have any holes or openings in at least the bottom case or housing 34, so as to allow for the penetration or a passage for the leaking fluid 18, to enter the inside of the sensing device 323, or that the bottom surface 33, has at least one water proofing screw cap 36, or at least one water proofing sealant 36, to plug or waterproof any opening for the screw 24, or similar such structure 24. Similarly, the portion of the sensor probe 22, which is not anticipated to be in contact with a fluid 18, could either be made waterproof, or have a coating of at least one fluid proof sealant 36. This waterproofing or fluid proofing is especially important for the area where the sensor probe 22, enters the housing 11, 14, 31, 34, of the smart alarm 323. It should be appreciated that the floating solution for the smart alarm 323, is a combination of mechanical design, and material selection. An important point is that the buoyancy or buoyant force (which depends on the properties of the fluid 18, and the weight/volume of the smart alarm 323) exceeds the gravity or sinking force, and allows the smart alarm 323, to naturally float over the fluid 18. Thus, as one can appreciate that the inventive smart alarm 323, is also splash resistance, which helps extend the useful life of the sensing device 323. Thus, it should be appreciated that both the wireless leak alarm device, and the action device can be made waterproof. It should be understood that the wireless leak alarm device 323, has at least one fluid leak broadcast means, and wherein the fluid leak broadcast means could be selected from a group comprising of a LED light emitter 26, a light emitter 26, a speaker 28, a sound maker 28, a buzzer 28, a Bluetooth communicator 177, a WiFi communicator 177, a wireless communicator 177, and combinations thereof, to name a few.

Figure 17:
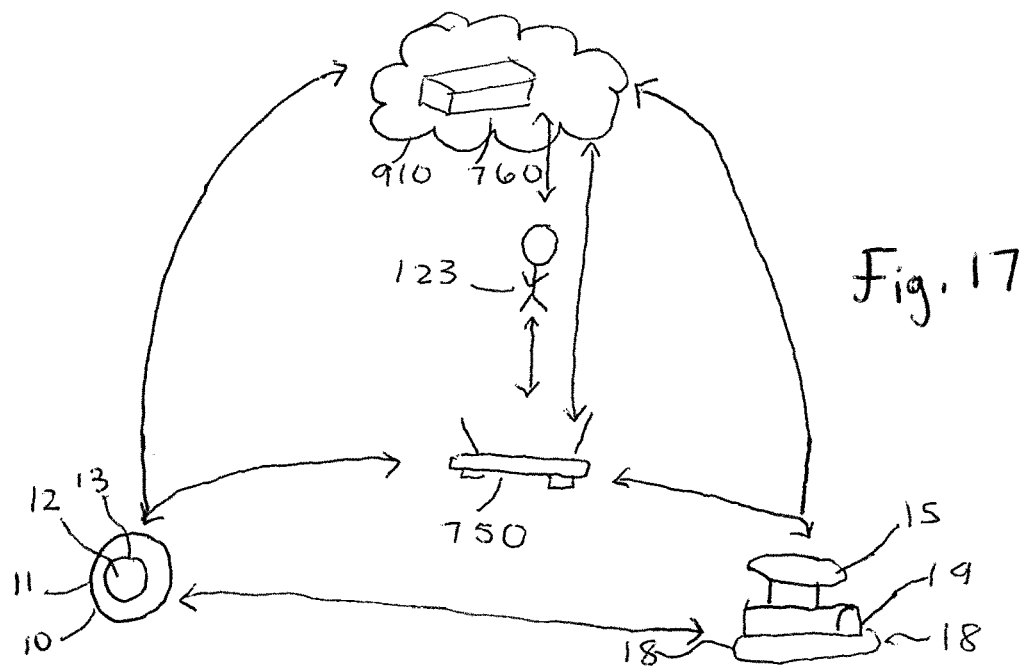
FIG. 17, illustrates an exemplary diagram of an exemplary communication network embodiment of the present invention.

FIG. 17, illustrates an exemplary diagram of an exemplary communication network embodiment 500, of the present invention. As has been stated earlier that the WiLA 10, WiVA 15, user 123, router or LAN 750, monitor server 760, and the Internet cloud communication 910, communicate each with the other in a number of ways. For example, the WiLA 10, can communicate with a user 123, via a router 750, or a monitor server 760, or the Internet cloud based communication network 910, and vice versa. Similarly, the WiVA 15, can communicate with a user 123, via a router 750, or a monitor server 760, or the Internet cloud based communication network 910, and vice versa. As one can appreciate that a WiLA 10, can be at a first location, and that the WiVA 15, can be at a second location, but they do wirelessly communicate each with the other, such as, either directly, or via a router 750, or the monitor server 760, or the Internet cloud based communication network 910. Thus, in case if one or more of a leg of the communication network 500, breaks down then the communication network 500, has built-in redundancies, and back-ups to allow wireless communications between the various components within the communication network 500.

With this invention one can extend the useful life of the various components of the inventive sensor 23, such as, for example, one can conserve the battery consumption to almost zero during the unit's sleep mode. This will increase the required battery replacement interval to the shelf life of the battery 37. In this design, once the user 123, stops interacting with WiLA 10, 20, 30, the WiLA unit 10, 20, 30, would go into a sleep mode. During the sleep mode WiLA 10, 20, 30, has the minimum battery consumption of, for example, less than 4 µA. The only element that the circuit keeps running during the sleep period is the clock IC (Internal Clock) to keep track of time, calendar and to initiate time based wake up interrupts. At the given intervals, for example, every 24 hours, or say 9 AM every morning, the calendar IC (Internal Clock) wakes up the WiLA unit 10, 20, 30, to report its status to the server 760, 940, and/or the user 123.

The illumination window 13, or the illumination ring 13, could also be an LED ring 13, or have an LED 26, on the top or upper side of the PCB Board 16, so that light from the LED 26, would be visible on the top surface of the upper housing 11, of the WiLA 10. For the purposes of illustration, and not any limitation, the LED ring 13, could be a combination of at least one Blue LED 26, and at least one Red LED 26, and their light emissions could be used to show the current state of the LED 26, or the status of the WiLA 10, such as, for example, a blinking Red LED 26, could mean that a fluid leak has been detected, and in this case the buzzer 28, would also automatically be activated. Similarly, a blinking Red LED 26, with a different pulse interval could mean that the WiLA 10, unit is not connected to any WiFi network, or that a user 123, for some reason, cannot directly connect to the WiLA unit 10. For example, a solid Red LED 26, light emission could mean that the WiLA unit 10, is not connected to a network, or that at least one user 123, has connected to the WiLA unit 10, directly. Similarly, a blinking Blue LED 26, emission could mean that the WiLA unit 10, is connected to a WiFi network, or that no user 123, is connected to the WiLA unit 10, directly. A solid Blue LED 26, light emission could mean that the WiLA unit 10, is connected to a network, or that at least one user 123, has connected to the WiLA unit 10, directly. The color or color combination for the LED 26, could be decided by a user 123, or a manufacturer of the inventive device 23, and similarly the blinking frequency, intensity, etc., could either be pre-programmed, or programmed by a user 123, by means which are well known in the art.

The inventive new valve control system on WiVA 15, 25, 35, can control the latching valve 140, 210, that is inside the pipe 19, 29, 39, to generate the ON, and OFF signals, to the valve 140, 210, so as to either open the valve 140, 210, or to shut it OFF. Since the ON, and OFF signal input to the valve 140, 210, is using the same common wire, the WiVA circuit generates control signal in a way that it doesn't cause any momentarily conflict between the ON, and the OFF signal, when switching from one setting to another setting.

It should be appreciated that a user 123, can easily pair or sync their smart devices with multiple Leak Alarm, and Smart Valve units 23. Likewise, multiple users 123, can be paired or synced with each individual WiLAs and WiVAs 23. All users 123, and devices paired or synced with a WiLA 10, receive leak and status notifications instantly at the same time.

In one exemplary embodiment, a leak sensing unit is capable of detecting a leak or a predetermined amount of liquid, such as, for example, a stream of fluid, or a flood by measuring the electrical conductivity (or impedance) at two ends of its metal probe. Once the conductivity of a liquid, such as, water between the two metal probes reaches to a defined point, an internal flag turns on or is activated, and an alert signal is sent to the microcontroller.

In one exemplary embodiment, a microcontroller is responsible to initialize other components of the board, such as, for example, speakers (or buzzer), WiFi module, Bluetooth module, LEDs, etc. In one exemplary embodiment, the microcontroller monitors the battery level, and updates the battery indicator on user's remote device. In one exemplary embodiment, the microcontroller is also responsible for providing requested data to a connected remote device.

In one exemplary embodiment, the WiFi module is a WiFi IEEE 802.11 (a/b/g/n/d/e/i/k/r/ac/ad) standard module that is a wireless transceiver which transmits and receives data between microcontroller and user's smart device. In one exemplary embodiment, the WiFi IEEE 802.11 (ah/aj/ax/ay) standard module that is a wireless transceiver which transmits and receives data between microcontroller and the user's smart device or netport axis point. In one exemplary embodiment, the Wi Fi module establishes the connection in two ways, such as, for example, acting as an Access Point (AP), the WiFi module can be initialized by the microcontroller to be a host to WiFi devices such that all the nearby devices can discover and connect to the Wi-Fi leak alert monitoring system. In one exemplary embodiment, the WiFi module acts as a network client where the WiFi module can be initialized by a microcontroller to act as a client to connect to an existing Wi-Fi network and connect to the Internet using an existing wireless hub or router. The network configuration is done by using a custom designed application on a smart device. In one exemplary embodiment, the WiFi module is programmed through SDIO, UART or I2C interfaces. In one exemplary embodiment, the transmission antenna can be integrated on the module or connected externally.

In one exemplary embodiment, the LED Indicator includes at least one LED that flashes when a leak is detected, or the battery is low.

In one exemplary embodiment, a notifying element, such as, for example, a buzzer, generates alert sound when a leak is detected, notifying the home owner, property manager, etc.; also the buzzer sends a buzz when the battery is low.

In one exemplary embodiment, the PMS is responsible for providing power to each component on the system. The PMS includes regulator ICs, voltage converters, voltage monitoring IC and surge protection circuitry.

In one exemplary embodiment, the power source is supplied by replaceable or rechargeable batteries. In one exemplary embodiment, power is supplied by an internal battery where the battery is charged wirelessly using inductive charging method. In one exemplary embodiment, the inductive battery charger can be used to indicate a power outage in the host building.

Applications of the present invention may be configured in numerous exemplary methodologies. In one example, a configuration is as follows:
Device name,
Date and time,
Network configuration,
Phone number(s) to send text or call,
Email address(es) to send email,
Reset/clear log,
Valve(s) action configuration,
Linking sensors and valves, and/or
External device drivers.

In one exemplary embodiment, electronic valves may be configured in several ways. In one example, the electronic valve may be configured manually when the user needs to connect to the electronic valve remotely and turn the valve on or off. In another example, the electronic valve may be configured automatically where the valve would turn off automatically once a leak alert is detected. Later the user can reset the valve to "on" once the leak area is inspected. Yet in another example, the electronic valve may be configured with a timer functionality whereby the electronic valve will be shut off automatically after a given amount of time once an alert is detected. This will give the user enough time to investigate the cause of the alert, but if the user is busy or out of reach, the valve would default to "off" for security and safety purposes.

Another exemplary embodiment to setup the Wi-Fi leak monitoring system is by installing a monitoring server connected to the same network as sensors are connected to monitor all the Wi-Fi leak alert sensors activities at the same time from one universal server. This method of monitoring is beneficial to residential complexes, hospitals, educational academies or any other large facilities which requires more than one Wi-Fi sensor to be installed. In this exemplary configuration all the WiFi sensor devices will be programmed to report to the main server and an administrator or operator can review and monitor events and take a required action when an alert received from a sensor. Moreover, the software on the monitoring server will be able to control a variety of devices such as electrical switches, valves and equipment on the same network and different locations remotely through Wi-Fi network. For example, an administrator in a hospital may shut down a malfunctioning washer-dryer remotely by using the monitoring software when a washer dryer is leaking water on the floor.

The instructions may be loaded into the memory of the server or client computers from a storage device or from one or more other computer systems over a network connection. For example, a client computer may transmit a sequence of instructions to the server computer in response to a message transmitted to the client over a network by the server. In one exemplary embodiment, as the server receives the instructions over the network connection, it stores the instructions in memory. The server may store the instructions for later execution, or it may execute the instructions as they arrive over the network connection. In some cases, the CPU may directly support the downloaded instructions. In other cases, the instructions may not be directly executable by the CPU, and may instead be executed by an interpreter that interprets the instructions. In other embodiments, hardwired circuitry may be used in place of, or in combination with, software instructions to implement the present invention. Thus tools used in the present invention are not limited to any specific combination of hardware circuitry and software, nor to any particular source for the instructions executed by the server or client computers. In some instances, the client and server functionality may be implemented on a single computer platform.

Thus, the present invention is not limited to the embodiments described herein and the constituent elements of the invention can be modified in various manners without departing from the spirit and scope of the invention. Various aspects of the invention can also be extracted from any appropriate combination of a plurality of constituent elements disclosed in the embodiments. Some constituent elements may be deleted in all of the constituent elements disclosed in the embodiments. The constituent elements described in different embodiments may be combined arbitrarily.

The embodiments of the present invention as described more fully with reference to the accompanying drawings, which form a part hereof, and which show, by way of illustration, specific exemplary embodiments by which the invention may be practiced. This invention may, however, be embodied in many different forms and should not be construed as limited to the embodiments set forth herein. Rather, the disclosed embodiments are provided so that this disclosure will be thorough and complete, and will fully convey the scope of the invention to those skilled in the art.

It should be further understood that throughout the specification and claims several terms have been used and they take the meanings explicitly associated herein, unless the context clearly dictates otherwise. For example, the phrase "in one embodiment" as used herein does not necessarily refer to the same embodiment, though it may. Additionally, the phrase "in another embodiment" as used herein does not necessarily refer to a different embodiment, although it may. Thus, various embodiments of the invention may be readily combined, without departing from the scope or spirit of the invention.

Still further, while certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

While the present invention has been particularly described in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. A wireless leak alarm, and wireless valve, apparatus, comprising:
   (a) at least one wireless leak alarm device, said at least one wireless leak alarm device comprises at least one first microcontroller, at least one first wireless communication module, at least one leak sensor adapted to detect a leak of a substance, at least one battery, and at least one fluid leak broadcast means;
   (b) said at least one first microcontroller adapted to receive a signal from said at least one leak sensor;
   (c) said at least one first wireless communication module adapted to receive a signal from said at least one first microcontroller, whereby said at least one first wireless communication module transmits an electronic message to one of at least one user and a monitor server via at least one first wireless communication network, whereby said at least one user wirelessly communicates user's instructions to exercise control over at least one action device using said at least one first wireless communication network, wherein said at least one action device comprises a power module, a second wireless communication module, a second microcontroller, a relay, and at least one electrical valve, and wherein said relay transmits at least one electrical signal to said electrical valve upon receipt of instructions from said at least one user, and upon completing said at least one user's instructions said wireless communication module sends an acknowledgement of completion of said at least one user's instructions to said at least one user using said at least one first wireless communication network; and
   (d) wherein said at least one leak sensor has at least one external probe which comes in contact with said leaking substance, and wherein said at least one wireless leak alarm device is made of a material that is lighter than said leaking substance, so that said at least one wireless leak alarm device automatically floats under substance leaking conditions.

2. The wireless leak alarm, and wireless valve of claim 1, wherein said at least one wireless leak alarm device is paired with at least two of said at least one action device.

3. The wireless leak alarm, and wireless valve of claim 1, wherein at least two of said at least one wireless leak alarm device is paired with said at least one action device.

4. The wireless leak alarm, and wireless valve of claim 1, wherein at least one cloud based monitoring system monitors said at least one wireless leak alarm device, and said at least one action device.

5. The wireless leak alarm, and wireless valve of claim 1, wherein wireless communication between said at least one wireless leak alarm device, and said at least one action device is done via at least one encryption protocol.

6. The wireless leak alarm, and wireless valve of claim 1, wherein housing of said at least one wireless leak alarm device is waterproof.

7. The wireless leak alarm, and wireless valve of claim 1, wherein housing of said at least one action device is waterproof.

8. The wireless leak alarm, and wireless valve of claim 1, wherein said at least one wireless leak alarm device floats when said at least one wireless leak alarm device encounters a flood of a liquid.

9. The wireless leak alarm, and wireless valve of claim 1, wherein said at least one wireless leak alarm device remains in a sleep mode, until it encounters one of a leaking fluid, or a periodic status check.

10. The wireless leak alarm, and wireless valve of claim 9, wherein said periodic status check is done from a group consisting of, at a periodic interval, at a set time, upon demand, and combinations thereof.

11. The wireless leak alarm, and wireless valve of claim 1, wherein said at least one wireless leak alarm device is at a first location, and wherein said at least one action is at a second location.

12. The wireless leak alarm, and wireless valve of claim 1, wherein said at least one action device is secured to a fluid conduit, and wherein at least a portion of an electrical valve of said action device is inside said fluid conduit.

13. The wireless leak alarm, and wireless valve of claim 1, wherein said at least one wireless leak alarm device is set-up in a mesh network, and wherein said at least one wireless leak alarm device is connected to at least one wireless access point hub to communicate with at least one monitoring server.

14. The wireless leak alarm, and wireless valve of claim 1, wherein said at least one first wireless communication module is selected from a group consisting of a Bluetooth module, a WiFi module, and a WiFi IEEE 802.11 (a/b/g/n/d/e/i/k/r/ac/ac/ad) module.

15. The wireless leak alarm, and wireless valve of claim 1, wherein said at least one fluid leak broadcast means is selected from a group consisting of a LED light emitter, a light emitter, a speaker, a sound maker, a buzzer, a Bluetooth communicator, a WiFi communicator, a wireless communicator, and combinations thereof.

16. The wireless leak alarm, and wireless valve of claim 1, wherein said at least one wireless leak alarm device has at least one window to allow for the broadcasting from said at least one fluid leak broadcast means.

17. The wireless leak alarm, and wireless valve of claim 1, wherein said at least one wireless leak alarm device sends a wireless signal to at least one hub using said at least one first wireless communication network, and wherein said at least one hub communicates with at least one monitor server using at least one second wireless communication network.

18. The wireless leak alarm, and wireless valve of claim 1, wherein at least a portion of an upper surface of said at least one wireless leak alarm device has an umbrella shape.

19. The wireless leak alarm, and wireless valve of claim 1, wherein at least a portion of a lower housing of said at least one wireless leak alarm device is made using at least one material that floats on a liquid.

20. A method of remotely exercising control over an electrical valve comprising the steps of:
(a) positioning at least one wireless leak alarm device having at least one first microcontroller, at least one first wireless communication module, at least one leak sensor adapted to detect a leak of a substance, at least one battery, and at least one fluid leak broadcast means, in a location amenable to detecting leaks;
(b) receiving a notification of a fluid leak from one of said at least one wireless leak alarm device via said at least one first wireless communication module via at least one first wireless communication network;
(c) communicating instructions from one of at least one user and monitor server using said at least one first wireless communication network to a second microcontroller via a second wireless communication module to exercise control over an electrical valve, whereby causing said electrical valve to be shut off to stop said fluid leak, and upon completing said at least one user's instructions said second wireless communication module sends an acknowledgement of completion of said at least one user's instructions to said at least one user using said at least one first wireless communication network; and
(d) said at least one leak sensor having at least one external probe which comes in contact with said leaking substance, and wherein said at least one wireless leak alarm device is made of a material that is lighter than said leaking substance, so that said at least one wireless leak alarm device automatically floats under substance leaking conditions.

\* \* \* \* \*